(12) United States Patent
Kawai

(10) Patent No.: US 8,011,837 B2
(45) Date of Patent: Sep. 6, 2011

(54) VIBRATING DEVICE AND IMAGE EQUIPMENT HAVING THE SAME

(75) Inventor: Sumio Kawai, Hachioji (JP)

(73) Assignee: Olympus Imaging Corp. (JP)

( * ) Notice: Subject to any disclaimer, the term of this patent is extended or adjusted under 35 U.S.C. 154(b) by 80 days.

(21) Appl. No.: 12/641,379

(22) Filed: Dec. 18, 2009

(65) Prior Publication Data

US 2010/0158501 A1    Jun. 24, 2010

(30) Foreign Application Priority Data

Dec. 22, 2008   (JP) .................................. 2008-326377

(51) Int. Cl.
*G03B 17/00* (2006.01)
*A47L 13/502* (2006.01)

(52) U.S. Cl. .......................................... 396/439; 15/94
(58) Field of Classification Search .................... 396/55, 396/429, 439; 348/335, 340, 360; 359/507; 15/94

See application file for complete search history.

(56) References Cited

U.S. PATENT DOCUMENTS

| 7,006,138 B2 | 2/2006 | Kawai | 348/340 |
| 7,492,408 B2 | 2/2009 | Ito | 348/335 |
| 2004/0169761 A1* | 9/2004 | Kawai et al. | 348/335 |

* cited by examiner

*Primary Examiner* — W. B. Perkey
*Assistant Examiner* — Minh Q Phan
(74) *Attorney, Agent, or Firm* — Ostrolenk Faber LLP

(57) ABSTRACT

A vibrating device includes a dust-screening member shaped like a plate as a whole, a first vibrating member secured to the dust-screening member and configured to cause, when driven alone, the dust-screening member to undergo first standing-wave vibration, and a second vibrating member secured to the dust-screening member and configured to cause, when driven alone, the dust-screening member to undergo second standing-wave vibration. The first vibrating member and the second vibrating member are so positioned that the first standing-wave vibration and second standing-wave vibration produced by the first and second vibrating members, respectively, overlap each other, thus producing a travelling wave propagating in one direction and having nodes regions at an outer circumferential edge of the dust-screening member, the node regions having virtually no vibrational amplitude.

19 Claims, 13 Drawing Sheets

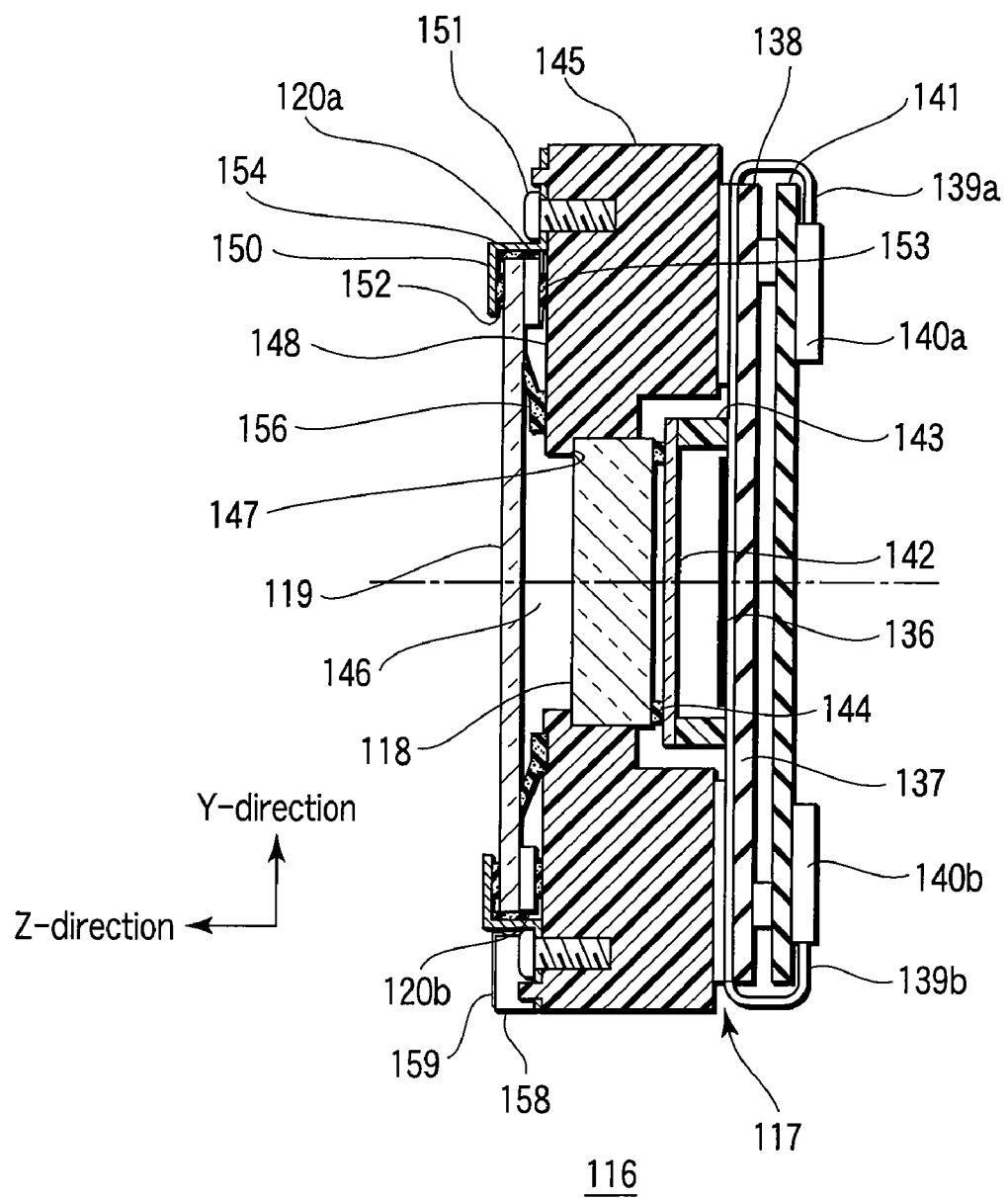
F I G. 2A

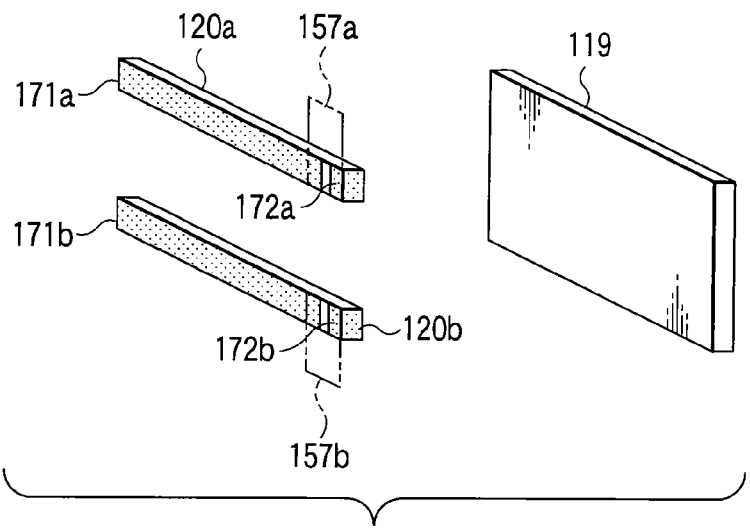
FIG. 3
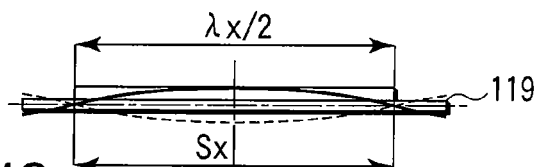
FIG. 4C
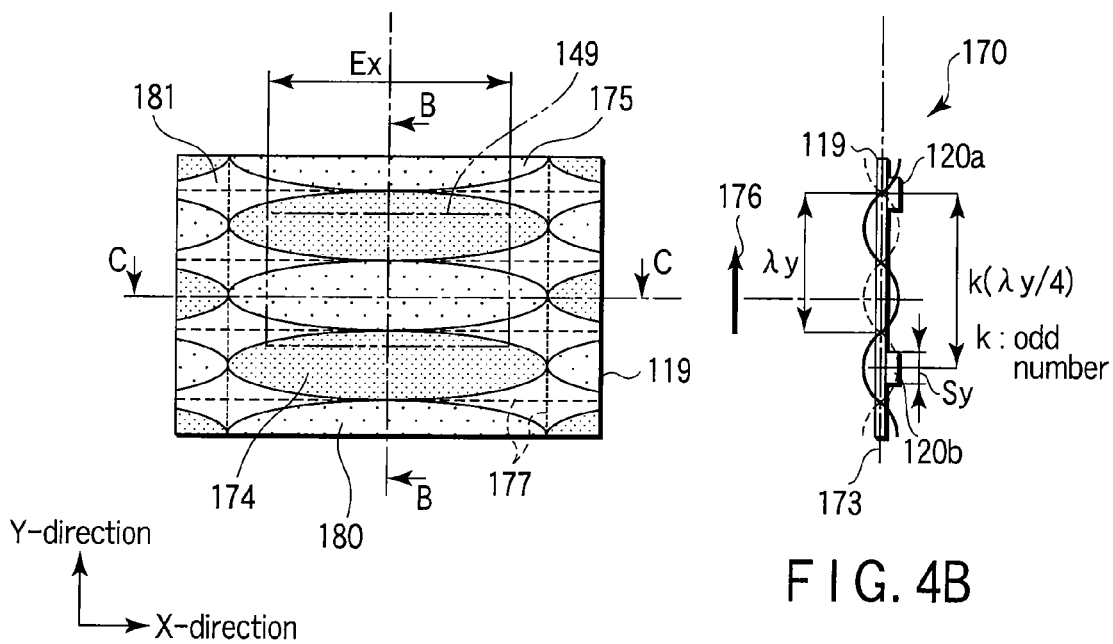
FIG. 4B
FIG. 4A

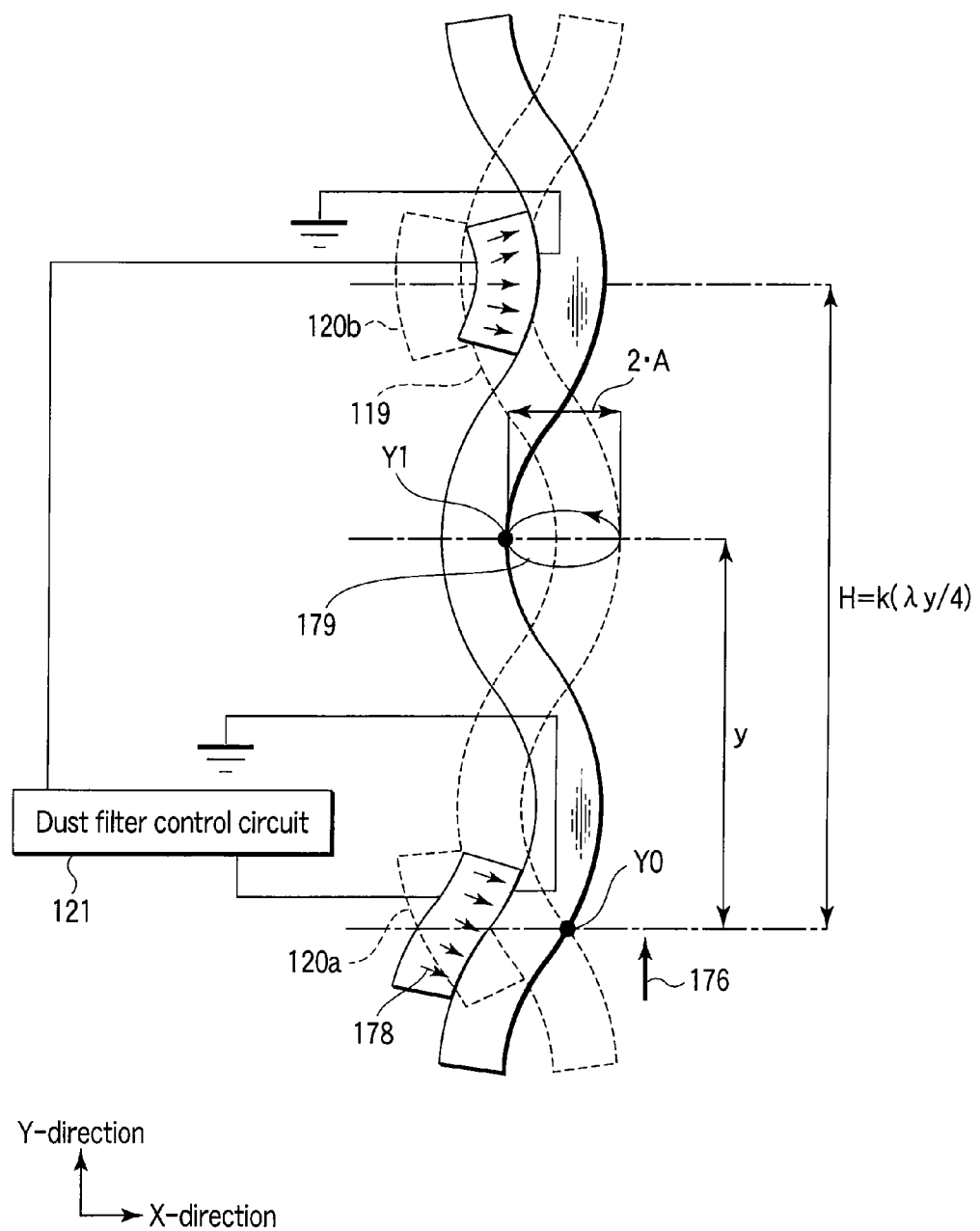
F I G. 5

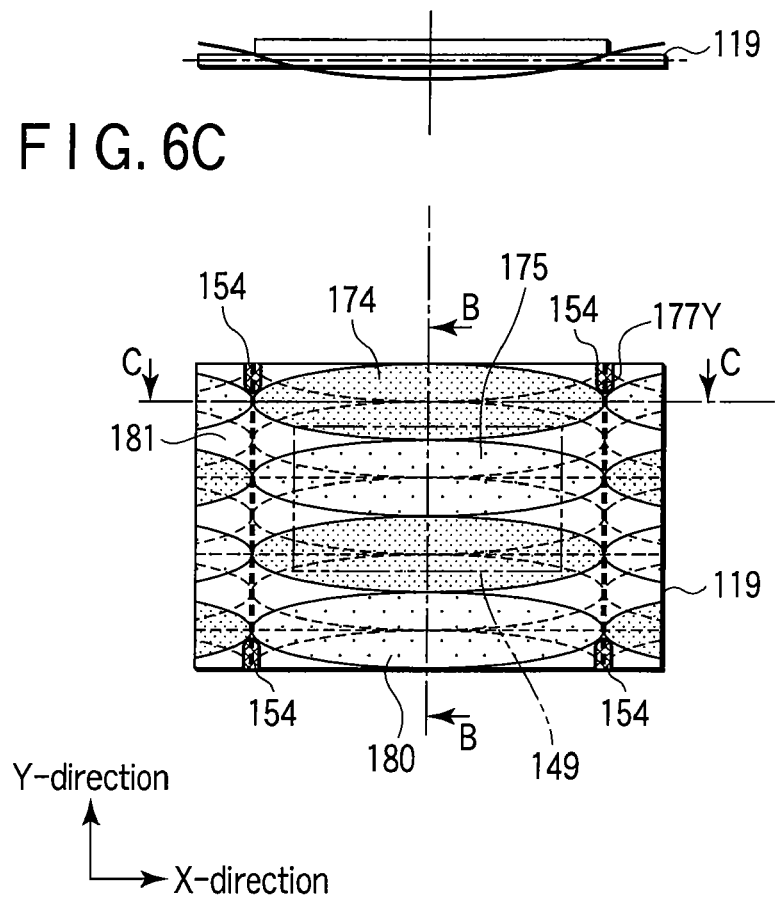
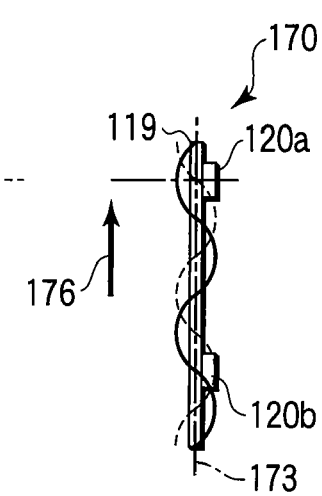
FIG. 6C
FIG. 6B
FIG. 6A

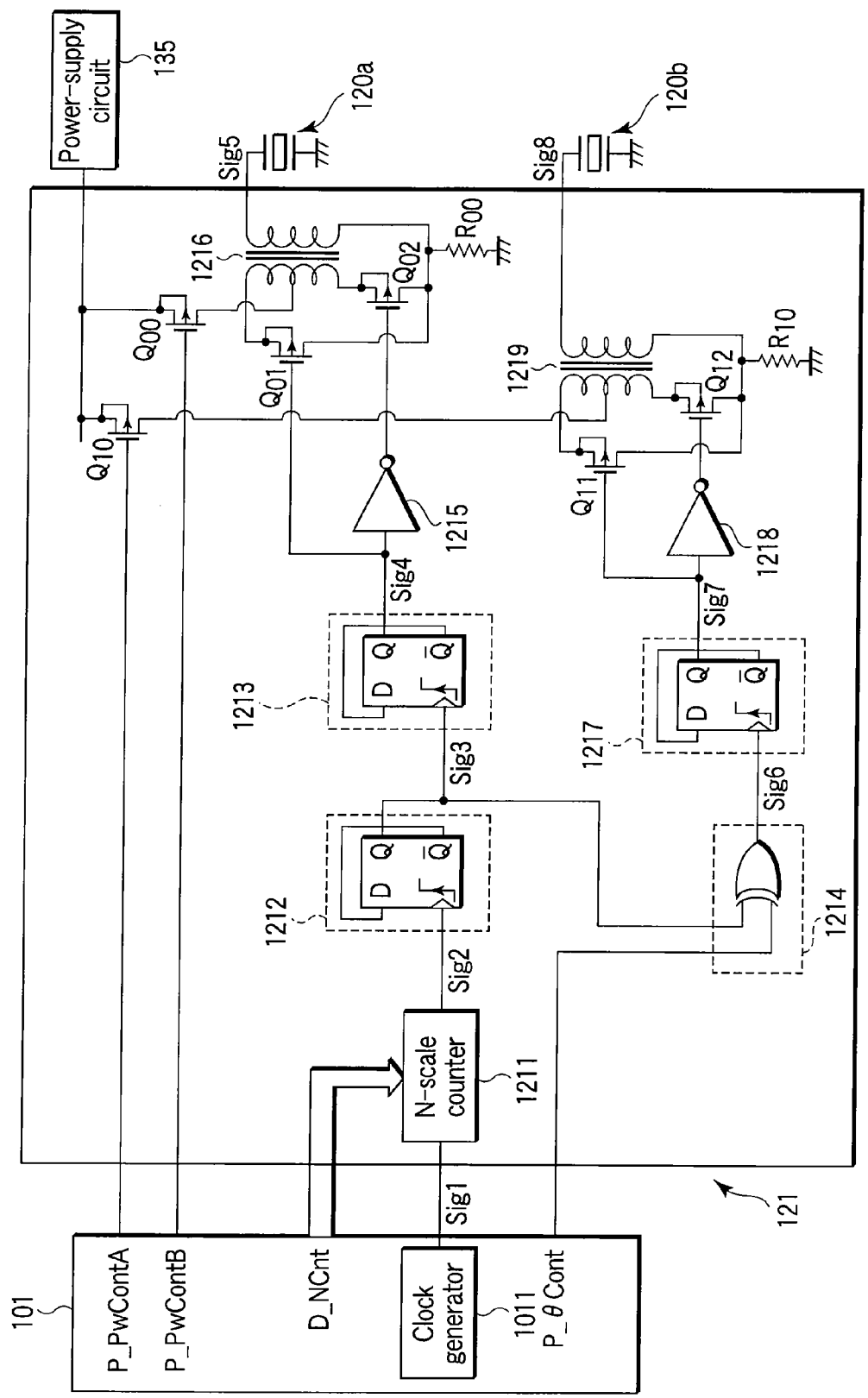
F I G. 7

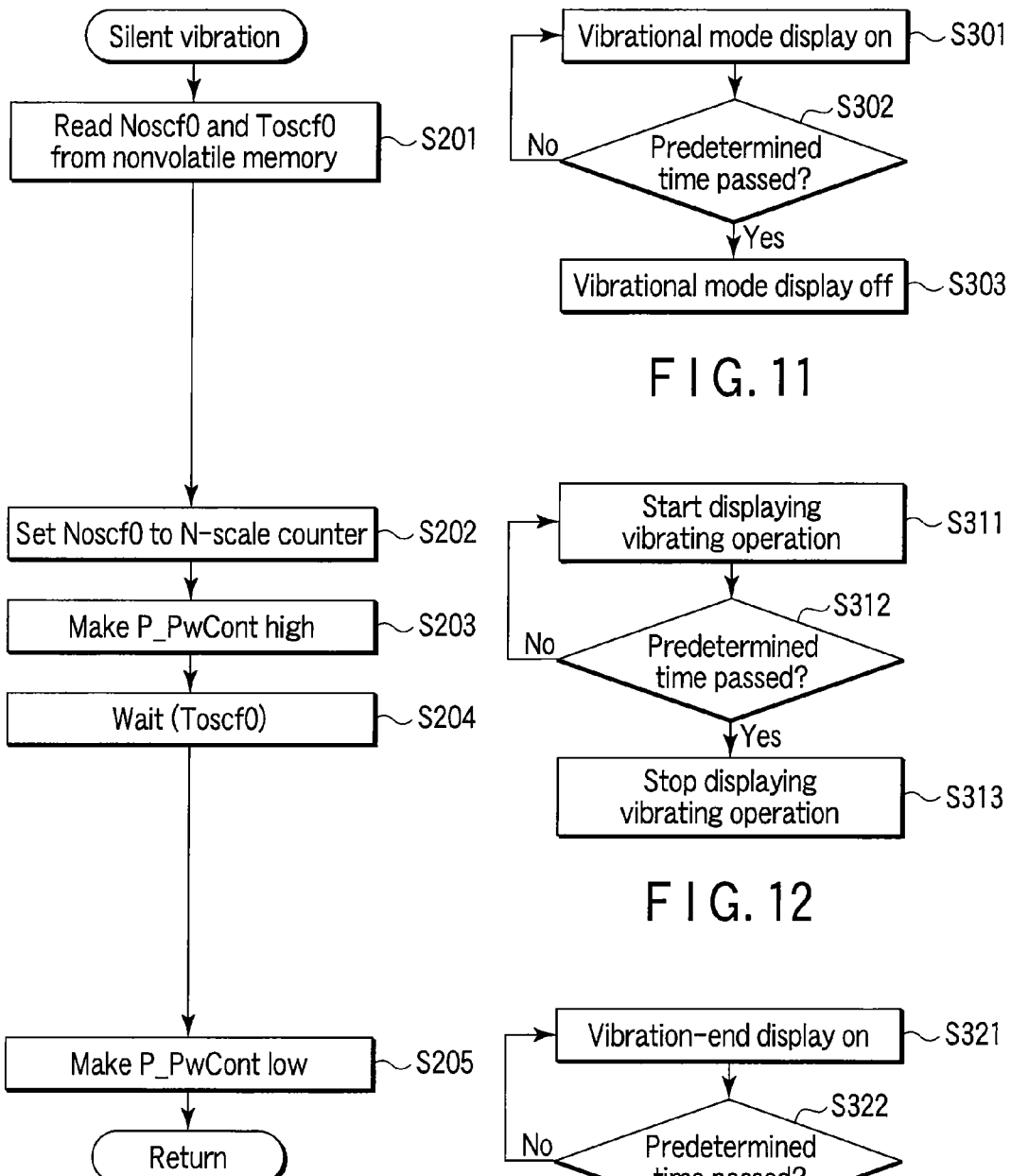
F I G. 10
F I G. 11
F I G. 12
F I G. 13

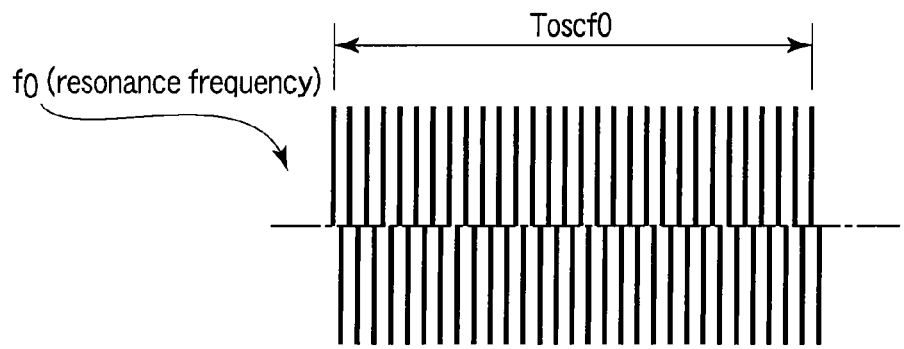
F I G. 14
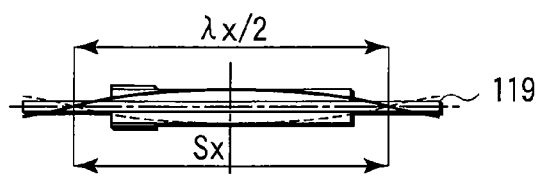
F I G. 15C
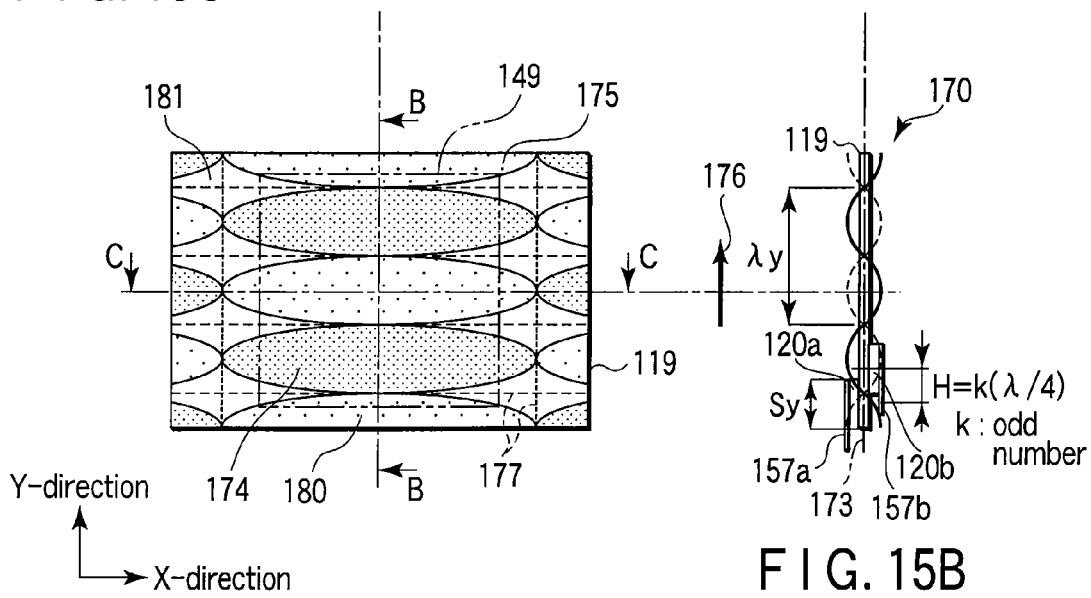
F I G. 15B
F I G. 15A

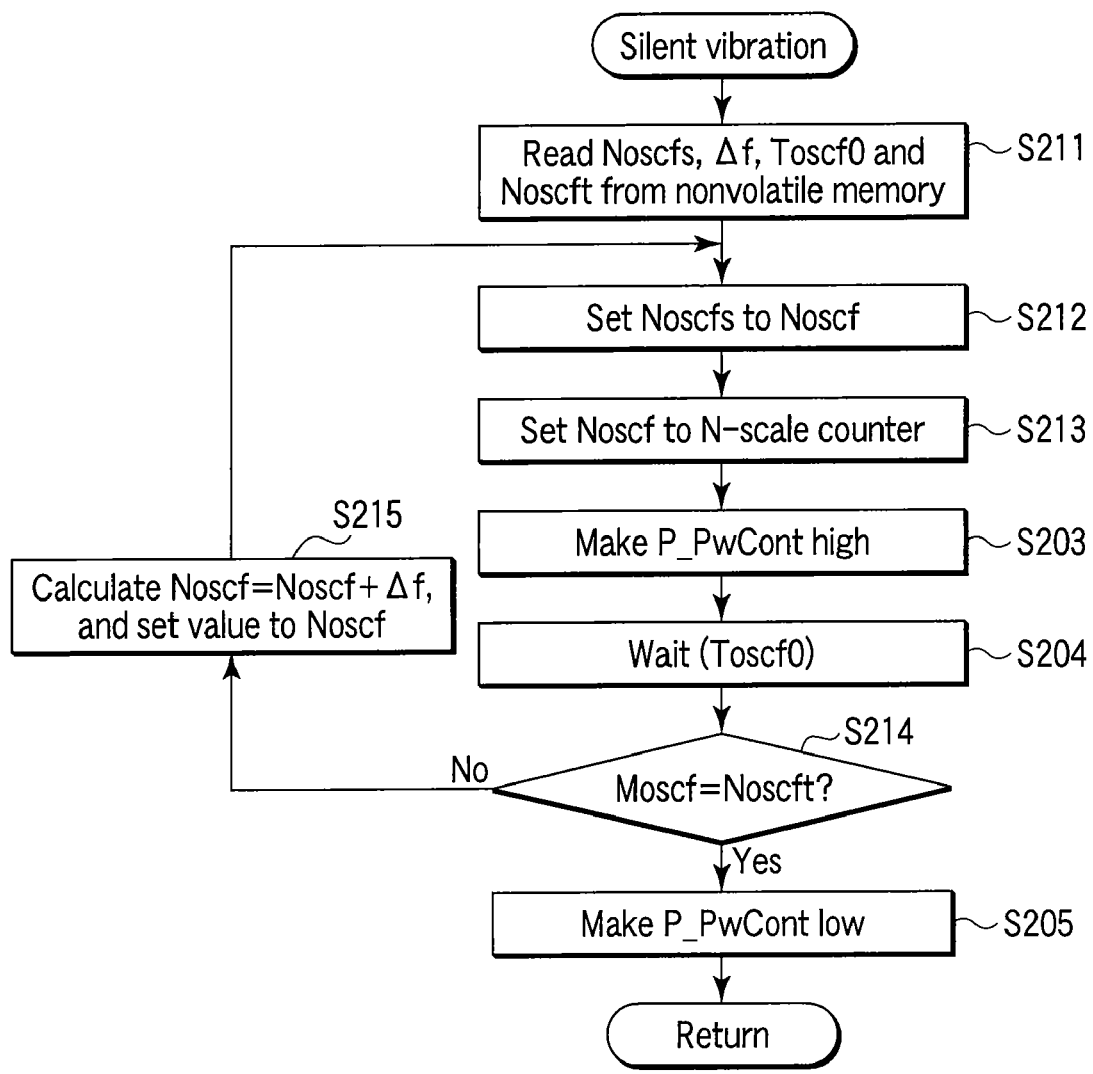
F I G. 16

VIBRATING DEVICE AND IMAGE EQUIPMENT HAVING THE SAME

CROSS-REFERENCE TO RELATED APPLICATIONS

This application is based upon and claims the benefit of priority from prior Japanese Patent Applications No. 2008-326377, filed Dec. 22, 2008; and No. 2009-263998, filed Nov. 19, 2009, the entire contents of both of which are incorporated herein by reference.

BACKGROUND OF THE INVENTION

1. Field of the Invention

The present invention relates to image equipment having image forming elements such as an image sensor element or a display element, and also to a vibrating device designed to vibrate the dust-screening member that is arranged at the front of each image forming element of such an image equipment.

2. Description of the Related Art

As image equipment having image forming elements, there is known an image acquisition apparatus that has an image sensor element configured to produce a video signal corresponding to the light applied to its photoelectric conversion surface. Also known is an image projector that has a display element, such as liquid crystal element, which displays an image on a screen. In recent years, image equipment having such image forming elements have been remarkably improved in terms of image quality. If dust adheres to the surface of the image forming element such as the image sensor element or display element or to the surface of the transparent member (optical element) that is positioned in front of the image forming element, the image produced will have shadows of the dust particles. This makes a great problem.

For example, digital cameras of called "lens-exchangeable type" have been put to practical use, each comprising a camera body and a photographic optical system removably attached to the camera body. The lens-exchangeable digital camera is so designed that the user can use various kinds of photographic optical systems, by removing the photographic optical system from the camera body and then attaching any other desirable photographic optical system to the camera body. When the photographic optical system is removed from the camera body, the dust floating in the environment of the camera flows into the camera body, possibly adhering to the surface of the image sensor element or to the surface of the transparent member (optical element), such as a lens, cover glass or the like, that is positioned in front of the image sensor element. The camera body contains various mechanisms, such as a shutter and a diaphragm mechanism. As these mechanisms operate, they produce dust, which may adhere to the surface of the image sensor element as well.

Projectors have been put to practical use, too, each configured to enlarge an image displayed by a display element (e.g., CRT or liquid crystal element) and project the image onto a screen so that the enlarged image may be viewed. In such a projector, too, dust may adhere to the surface of the display element or to the surface of the transparent member (optical element), such as a lens, cover glass or the like, that is positioned in front of the display element, and enlarged shadows of the dust particles may inevitably be projected to the screen.

Various types of mechanisms that remove dust from the surface of the image forming element or the transparent member (optical element) that is positioned in front of the image sensor element, provided in such image equipment have been developed.

For example, U.S. Pat. No. 7,492,408 discloses electronic image acquisition equipment that includes a dust removing mechanism. In the dust removing mechanism, a transparent glass plate shaped like a disc (dust-screening member) is arranged on the front of an image sensor element, forming one unit, and a pair of ring-shaped piezoelectric elements (vibrating members) are secured to the glass plate, each extending along the circumference of the glass plate. A voltage of a prescribed frequency is applied to each piezoelectric element, producing a bending wave that travels in the circumferential direction of the glass plate. Dust is thereby removed from the glass plate shaped like a disc. U.S. Pat. No. 7,492,408 also discloses a method of producing a wave travelling in the circumferential direction of the glass plate. In this method, ring-shaped piezoelectric element is secured and positioned concentric to the glass plate shaped like a disc.

U.S. Pat. No. 7,006,138 discloses a camera that includes a dust-removing mechanism. This dust-removing mechanism has two piezoelectric elements provided, respectively, at two opposite sides of a dust-screening member shaped like a rectangular plate. The piezoelectric elements are vibrated at a prescribed frequency, and causing the dust-screening member to undergo resonation. Thus, the mechanism operates in a vibrational mode, producing a bending wave that travels from one of the sides to the other side, thereby removing dust from the rectangular dust-screening member. In such vibrational mode as disclosed in U.S. Pat. No. 7,006,138, the dust-screening member to which the piezoelectric elements, i.e., vibrating members, are secured vibrates at the same amplitude at its entire surface.

BRIEF SUMMARY OF THE INVENTION

According to a first aspect of the present invention, there is provided a vibrating device comprising:

a dust-screening member shaped like a plate as a whole;

a first vibrating member secured to the dust-screening member and configured to cause, when driven alone, the dust-screening member to undergo first standing-wave vibration; and a second vibrating member secured to the dust-screening member and configured to cause, when driven alone, the dust-screening member to undergo second standing-wave vibration, wherein the first vibrating member and the second vibrating member are so positioned that the first standing-wave vibration and second standing-wave vibration produced by the first and second vibrating members, respectively, overlap each other, thus producing a travelling wave propagating in one direction and having nodes regions at an outer circumferential edge of the dust-screening member, the node regions having virtually no vibrational amplitude.

According to a second aspect of the present invention, there is provided an image equipment comprising:

an image forming element having an image surface on which an optical image is formed;

a dust-screening member which is shaped like a plate as a whole and has a light-transmitting region flaring in a radial direction from the center, facing the image surface and spaced therefrom by a predetermined distance;

a sealing structure configured to surround the image forming element and the dust-screening member, thereby providing a closed space in which the image forming element and the dust-screening member that face each other;

a first vibrating member arranged on the dust-screening member and outside the light-transmitting region through which a light beam for forming an optical image on the image surface passes, and configured to cause, when driven alone, the dust-screening member to undergo first standing-wave vibration; and a second vibrating member arranged on the dust-screening member and outside the light-transmitting region, not overlapping the first vibrating member, and configured to cause, when driven alone, the dust-screening member to undergo second standing-wave vibration, wherein the first vibrating member and the second vibrating member are so positioned that the first standing-wave vibration and second standing-wave vibration produced by the first and second vibrating members, respectively, overlap each other, thus producing a travelling wave propagating in one direction and having nodes regions at an outer circumferential edge of the dust-screening member, the node regions having virtually no vibrational amplitude.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2A is a vertical side view of an image sensor element unit of the digital camera, which includes a dust removal mechanism (or a sectional view taken along line A-A shown in FIG. 2B);

FIG. 3 is an exploded perspective view showing a major component (vibrator) of the dust removal mechanism;

FIG. 4A is a front view of a dust filter, explaining how the dust filter is vibrated;

FIG. 4B is a sectional view of the dust filter, taken along line B-B shown in FIG. 4A;

FIG. 4C is a sectional view of the dust filter, taken along line C-C shown in FIG. 4A;

FIG. 5 is a diagram explaining the concept of a traveling wave produced at the dust filter;

FIG. 6A is a diagram showing the traveling wave that has traveled by a one-wave length from the state shown in FIG. 4A;

FIG. 6B is a sectional view of the dust filter, taken along line B-B shown in FIG. 6A;

FIG. 6C is a sectional view of the dust filter, taken along line C-C shown in FIG. 6A;

FIG. 7 is a circuit diagram schematically showing the configuration of a dust filter control circuit;

FIG. 10 is a flowchart showing the operating sequence of "silent vibration" that is a subroutine shown in FIG. 9A;

FIG. 11 is a flowchart showing the operation sequence of the "display process" performed at the same time Step S201 of "silent vibration," i.e. subroutine (FIG. 10), is performed;

FIG. 12 is a flowchart showing the operating sequence of the "display process" performed at the same time Step S203 of "silent vibration," i.e., or subroutine (FIG. 10), is performed;

FIG. 13 is a flowchart showing the operating sequence of the "display process" performed at the same time Step S205 of "silent vibration," i.e., subroutine (FIG. 10), is performed;

FIG. 14 is a diagram showing the form of a resonance-frequency wave continuously supplied to vibrating members during silent vibration;

FIG. 15A is a front view of a dust filter, explaining how the dust filter vibrates in a digital camera that is a second embodiment of the image equipment according to this invention;

FIG. 15B is a sectional view of the dust filter, taken along line B-B shown in FIG. 15A;

FIG. 15C is a sectional view of the dust filter, taken along line C-C shown in FIG. 15A; and FIG. 16 is a flowchart showing the operating sequence of "silent vibration," i.e., subroutine in the operating sequence of the digital camera that is a third embodiment of the image equipment according to the present invention.

DETAILED DESCRIPTION OF THE INVENTION

Figure 1:
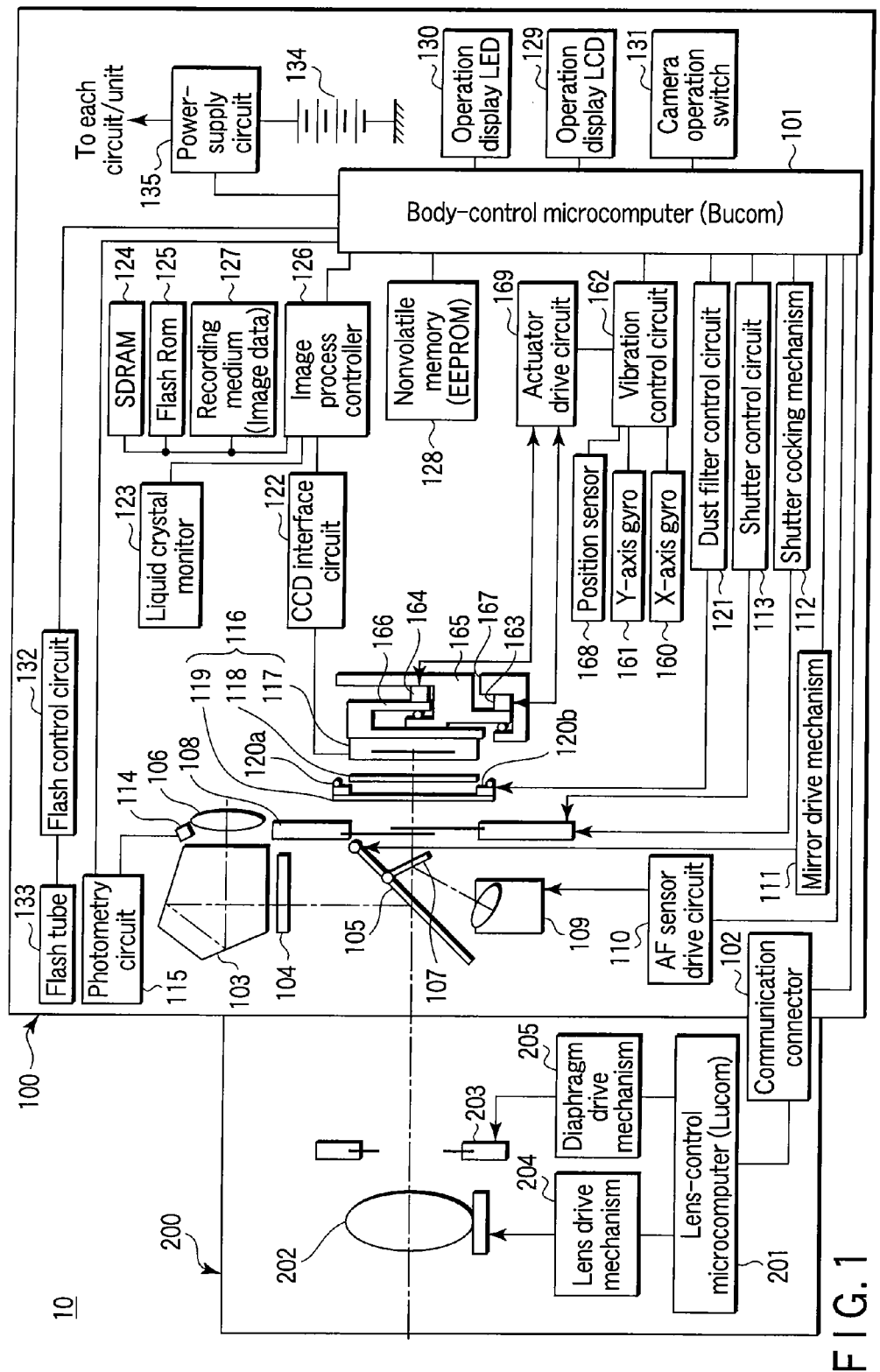
FIG. 1 is a block diagram schematically showing an exemplary system configuration, mainly electrical, of a lens-exchangeable, single-lens reflex electronic camera (digital camera) that is a first embodiment of the image equipment according to this invention.

Best modes of practicing this invention will be described with reference to the accompanying drawings.

First Embodiment

An image equipment according to this invention, which will be exemplified below in detail, has a dust removal mechanism for the image sensor element unit that performs photoelectric conversion to produce an image signal. Here, a technique of improving the dust removal function of, for example, an electronic camera (hereinafter called "camera" will be explained. The first embodiment will be described, particularly in connection with a lens-exchangeable, single-lens reflex electronic camera (digital camera), with reference to FIGS. 1 to 2B.

First, the system configuration of a digital camera 10 according to this embodiment will be described with reference to FIG. 1. The digital camera 10 has a system configuration that comprises body unit 100 used as camera body, and a lens unit 200 used as an exchange lens, i.e., one of accessory devices.

The lens unit 200 can be attached to and detached from the body unit 100 via a lens mount (not shown) provided on the front of the body unit 100. The control of the lens unit 200 is performed by the lens-control microcomputer (hereinafter called "Lucom") 201 provided in the lens unit 200. The control of the body unit 100 is performed by the body-control microcomputer (hereinafter called "Bucom" 101 provided in the body unit 100. By a communication connector 102, the Lucom 210 and the Bucom 101 are electrically connected to each other, communicating with each other, while the lens unit 200 remains attached to the body unit 100. The Lucom 201 is configured to cooperate, as subordinate unit, with the Bucom 101.

The lens unit 200 further has a photographic lens 202, a diaphragm 203, a lens drive mechanism 204, and a diaphragm drive mechanism 205. The photographic lens 202 is driven by a DC motor (not shown) that is provided in the lens drive mechanism 204. The diaphragm 203 is driven by a stepping motor (not shown) that is provided in the diaphragm drive mechanism 205. The Lucom 201 controls these motors in accordance with the instructions made by the Bucom 101.

In the body unit 100, a penta-prism 103, a screen 104, a quick return mirror 105, an ocular lens 106, a sub-mirror 107, a shutter 108, an AF sensor unit 109, an AF sensor drive circuit 110, a mirror drive mechanism 111, a shutter cocking mechanism 112, a shutter control circuit 113, a photometry sensor 114, and a photometry circuit 115 are arranged as shown in FIG. 1. The penta-prism 103, the screen 104, the quick return mirror 105, the ocular lens 106, and the sub-mirror 107 are single-lens reflex components that constitute an optical system. The shutter 108 is a focal plane shutter arranged on the photographic optical axis. The AF sensor unit 109 receives a light beam reflected by the sub-mirror 107 and detects the degree of defocusing. The AF sensor drive circuit 110 controls and drives the AF sensor unit 109. The mirror drive mechanism 111 controls and drives the quick return mirror 105. The shutter cocking mechanism 112 biases the spring (not shown) that drives the front curtain and rear curtain of the shutter 108. The shutter control circuit 113 controls the motions of the front curtain and rear curtain of the shutter 108. The photometry sensor 114 detects the light beam coming from the penta-prism 103. The photometry circuit 115 performs a photometry process on the basis of the light beam detected by the photometry sensor 114.

In the body unit 100, an image acquisition unit 116 is further provided to perform photoelectric conversion on the image of an object, which has passed through the above-mentioned optical system. The image acquisition unit 116 is a unit composed of a CCD 117 that is an image sensor element as an image forming element, an optical low-pass filter (LPF) 118 that is arranged in front of the CCD 117, and a dust filter 119 that is a dust-screening member. Thus, in this embodiment, a transparent glass plate (optical element) that has, at least at its transparent part, a refractive index different from that of air is used as the dust filter 119. Nonetheless, the dust filter 119 is not limited to a glass plate (optical element). Any other member (optical element) that exists in the optical path and can transmit light may be used instead. For example, the transparent glass plate (optical element) may be replaced by an optical low-pass filter (LPF), an infrared-beam filter, a deflection filter, a half mirror, or the like. In this case, the frequency and drive time pertaining to vibration and the position of a vibration member (later described) are set in accordance with the member (optical element). The CCD 117 is used as an image sensor element. Nonetheless, any other image sensor element, such as CMOS or the like, may be used instead.

As mentioned above, the dust filter 119 can be selected from various devices including an optical low-pass filter (LPF). However, this embodiment will be described on the assumption that the dust filter is a glass plate (optical element).

To the circumferential edge of the dust filter 119, two piezoelectric elements 120a and 120b are attached. The piezoelectric elements 120a and 120b have two electrodes each. A dust filter control circuit 121, which is a drive unit, drives the piezoelectric elements 120a and 120b at the frequency determined by the size and material of the dust filter 119. As the piezoelectric elements 120a and 120b vibrate, the dust filter 119 undergoes specific vibration. Dust can thereby be removed from the surface of the dust filter 119. To the image acquisition unit 116, an anti-vibration unit is attached to compensate for the motion of the hand holding the digital camera 10.

The digital camera 10 according to this embodiment further has a CCD interface circuit 122, a liquid crystal monitor 123, an SDRAM 124, a Flash ROM 125, and an image process controller 126, thereby to perform not only an electronic image acquisition function, but also an electronic record/display function. The CCD interface circuit 122 is connected to the CCD 117. The SDRAM 124 and the Flash ROM 125 function as storage areas. The image process controller 126 uses the SDRAM 124 and the Flash ROM 125, to process image data. A recording medium 127 is removably connected by a communication connector (not shown) to the body unit 100 and can therefore communicate with the body unit 100. The recording medium 127 is an external recording medium, such as one of various memory cards or an external HDD, and records the image data acquired by photography. As another storage area, a nonvolatile memory 128, e.g., EEPROM, is provided and can be accessed from the Bucom 101. The nonvolatile memory 128 stores prescribed control parameters that are necessary for the camera control.

To the Bucom 101, there are connected an operation display LCD 129, an operation display LED 130, a camera operation switch 131, and a flash control circuit 132. The operation display LCD 129 and the operation display LED 130 display the operation state of the digital camera 10, informing the user of this operation state. The operation display LED 129 or the operation display LED 130 has, for example, a display unit configured to display the vibration state of the dust filter 119 as long as the dust filter control circuit 121 keeps operating. The camera operation switch 131 is a group of switches including, for example, a release switch, a mode changing switch, a power switch, which are necessary for the user to operate the digital camera 10. The flash control circuit 132 drives a flash tube 133.

In the body unit 100, a battery 134 used as power supply and a power-supply circuit 135 are further provided. The power-supply circuit 135 converts the voltage of the battery 134 to a voltage required in each circuit unit of the digital camera 10 and supplies the converted voltage to the each circuit unit. In the body unit 100, too, a voltage detecting circuit (not shown) is provided, which detects a voltage change at the time when a current is supplied from an external power supply though a jack (not shown).

The components of the digital camera 10 configured as described above operate as will be explained below. The image process controller 126 controls the CCD interface circuit 122 in accordance with the instructions coming from the Bucom 101, whereby image data is acquired from the CCD 117. The image data is converted to a video signal by the image process controller 126. The image represented by the video signal is displayed by the liquid crystal monitor 123. Viewing the image displayed on the liquid crystal monitor 123, the user can confirm the image photographed.

The SDRAM 124 is a memory for temporarily store the image data and is used as a work area in the process of converting the image data. The image data is held in the recording medium 127, for example, after it has been converted to JPEG data.

The mirror drive mechanism 111 is a mechanism that drives the quick return mirror 105 between an up position and a down position. While the quick return mirror 105 stays at the down position, the light beam coming from the photographic lens 202 is split into two beams. One beam is guide to the AF sensor unit 109, and the other beam is guided to the penta-prism 103. The output from the AF sensor provided in the AF sensor unit 109 is transmitted via the AF sensor drive circuit 110 to the Bucom 101. The Bucom 101 performs the distance measuring of the known type. In the meantime, a part of the light beam, which has passed through the penta-prism 103, is guided to the photometry sensor 114 that is connected to the photometry circuit 115. The photometry circuit 115 performs photometry of the known type, on the basis of the amount of light detected by the photometry sensor 114.

Figure 2B:
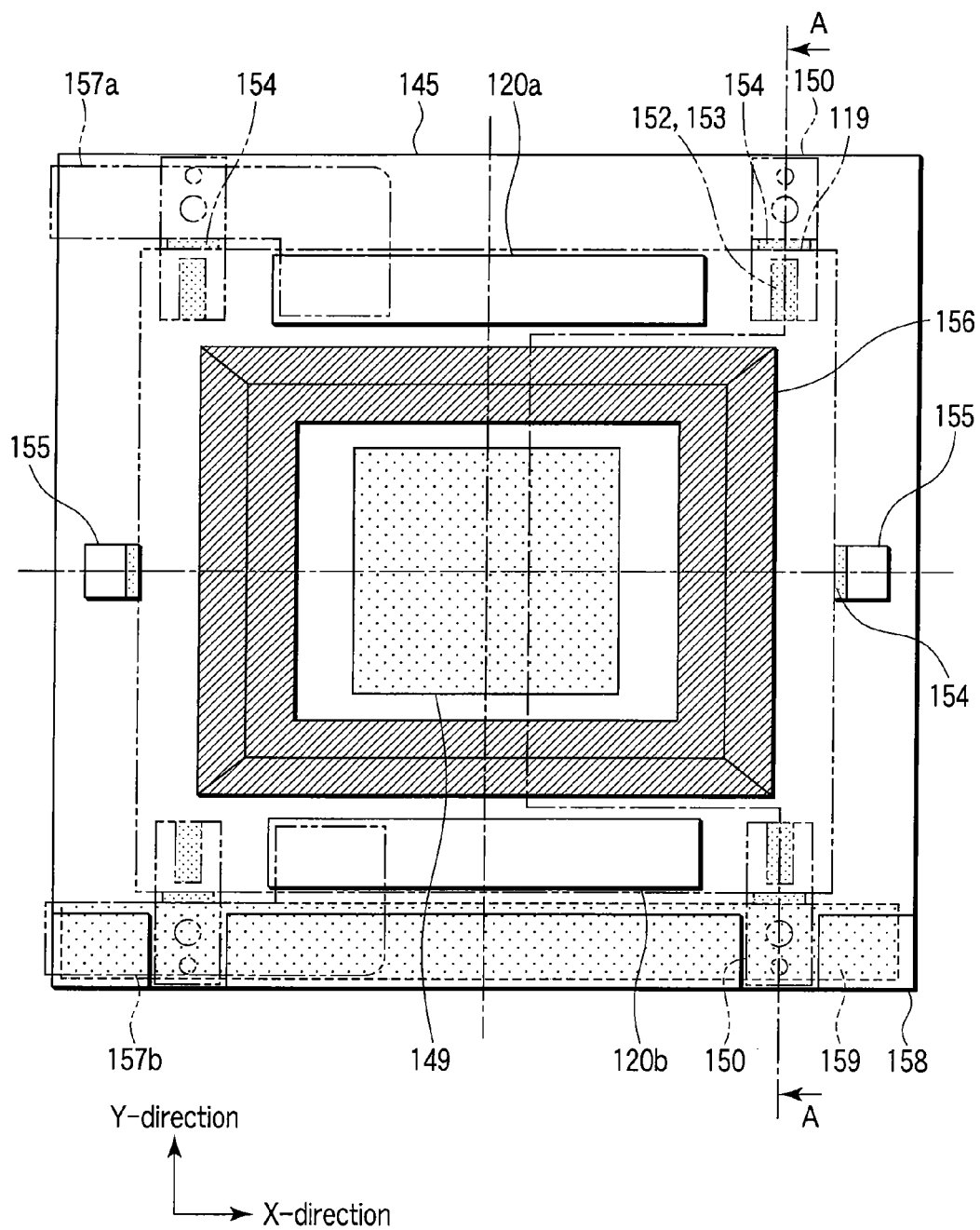
FIG. 2B is a front view of the dust removal mechanism, as viewed from the lens side.

The image acquisition unit 116 that includes the CCD 117 will be described with reference to FIGS. 2A and 2B. Note that the hatched parts shown in FIG. 2B show the shapes of members clearly, not to illustrating the sections thereof.

As described above, the image acquisition unit 116 has the CCD 117, the optical LPF 118, the dust filter 119, and the piezoelectric elements 120a and 120b. The CCD 117 is an image sensor element that produces an image signal that corresponds to the light applied to its photoelectric conversion surface through the photographic optical system. The optical LPF 118 is arranged at the photoelectric conversion surface of the CCD 117 and removes high-frequency components from the light beam coming from the object through the photographic optical system. The dust filter 119 is a dust-screening member arranged in front of the optical LPF 118 and facing the optical LPF 118, spaced apart therefrom by a predetermined distance. The piezoelectric elements 120a and 120b are arranged on the circumferential edge of the dust filter 119 and are vibrating members for applying specific vibration to the dust filter 119.

The CCD chip 136 of the CCD 117 is mounted directly on a flexible substrate 137 that is arranged on a fixed plate 138. From the ends of the flexible substrate 137, connection parts 139a and 139b extend. Connectors 140a and 140b are provided on a main circuit board 141. The connection parts 139a and 139b are connected to the connectors 140a and 140b, whereby the flexible substrate 137 is connected to the main circuit board 141. The CCD 117 has a protection glass plate 142. The protection glass plate 142 is secured to the flexible substrate 137, with a spacer 143 interposed between it and the flexible substrate 137.

Between the CCD 117 and the optical LPF 118, a filter holding member 144 made of elastic material is arranged on the front circumferential edge of the CCD 117, at a position where it does not cover the effective area of the photoelectric conversion surface of the CCD 117. The filter holding member 144 abuts on the optical LPF 118, at a part close to the rear circumferential edge of the optical LPF 118. The filter holding member 144 functions as a sealing member that maintains the junction between the CCD 117 and the optical LPF 118 almost airtight. A holder 145 is provided, covering seals the CCD 117 and the optical LPF 118 in airtight fashion. The holder 145 has a rectangular opening 146 in a part that is substantially central around the photographic optical axis. The inner circumferential edge of the opening 146, which faces the dust filter 119, has a stepped part 147 having an L-shaped cross section. Into the opening 146, the optical LPF 118 and the CCD 117 are fitted from the back. In this case, the front circumferential edge of the optical LPF 118 contacts the stepped part 147 in a virtually airtight fashion. Thus, the optical LPF 118 is held by the stepped part 147 at a specific position in the direction of the photographic optical axis. The optical LPF 118 is therefore prevented from slipping forwards from the holder 145. The level of airtight sealing between the CCD 117 and the optical LPF 118 is sufficient to prevent dust from entering to form an image having shadows of dust particles. In other words, the sealing level need not be so high as to completely prevent the in-flow of gasses.

On the front circumferential edge of the holder 145, a dust-filter holding unit 148 is provided, covering the entire front circumferential edge of the holder 145. The dust-filter holding unit 148 is formed, surrounding the stepped part 147 and projecting forwards from the stepped part 147, in order to hold the dust filter 119 in front of the LPF 118 and to space the filter 119 from the stepped part 147 by a predetermined distance. The opening of the dust-filter holding unit 148 serves as focusing-beam passing area 149. The dust filter 119 is shaped like a polygonal plate as a whole (a square plate, in this embodiment). The dust filter 119 is supported on the dust-filter holding unit 148, pushed onto the dust-filter holding unit 148 by a pushing member 150 which is constituted by an elastic body such as a leaf spring and has one end fastened with screws 151 to the dust-filter holding unit 148. More specifically, a cushion member 152 made of vibration attenuating material, such as rubber or resin, is interposed between the pushing member 150 and the dust filter 119. On the other hand, between the back of the dust filter 119 and the dust-filter holding unit 148, a cushion member 153 is interposed, which is almost symmetric with respect to the photographic optical axis and which is made of vibration-attenuating material such as rubber. The cushion members 152 and 153 hold the dust filter 119, not to impede the vibration of the dust filter 119. The dust filter 119 is positioned with respect to the Y-direction in the plane that is perpendicular to the optical axis, as that part of the pushing member 150 which is bent in the Z-direction, receive a force through a support member 154. On the other hand, the dust filter 119 is positioned with respect to the X-direction in the plane that is perpendicular to the optical axis, as a support part 155 provided on the holder 145 receive a force through the support member 154, as is illustrated in FIG. 2B. The support member 154 is made of vibration-attenuating material such as rubber or resin, too, not to impede the vibration of the dust filter 119. The cushion members 152 and 153 may be located at nodes of the vibration of the dust filter 119, which will be described later. In this case, the vibration of the dust filter 119 will be almost impeded. This can provide an efficient dust removal mechanism that achieves vibration of large amplitude. Between the circumferential edge of the dust filter 119 and the dust-filter holding unit 148, a seal 156 having an annular lip part is arranged, defining an airtight space including an opening 146. The image acquisition unit 116 is thus configured as an airtight structure that has the holder 145 having a desired size and holding the CCD 117. The level of airtight sealing between the dust filter 119 and the dust-filter holding unit 148 is sufficient to prevent dust from entering to form an image having shadows of dust particles. The sealing level need not be so high as to completely prevent the in-flow of gasses.

As described above, the dust filter 119 is supported to the dust-filter holding unit 148 by the pushing member 150 via the cushion members 152 and 153. Nonetheless, the dust filter 119 may be supported by the seal 156, not by the cushion member 153 at least.

To the ends of the piezoelectric elements 120a and 120b, which are vibrating members, flexes 157a and 157b, i.e., flexible printed boards, are electrically connected. The flexes 157a and 157b input an electric signal (later described) from the dust filter control circuit 121 to the piezoelectric elements 120a and 120b, causing the elements 120a and 120b to vibrate in a specific way. The flexes 157a and 157b are made of resin and cupper etc., and have flexibility. Therefore, they little attenuate the vibration of the piezoelectric elements 120a and 120b. The flexes 157a and 157b are provided at positions where the vibrational amplitude is small (at the nodes of vibration, which will be described later), and can therefore suppress the attenuation of vibration. The piezoelectric elements 120a and 120b move relative to the body unit 100 if the camera 10 has such a hand-motion compensating mechanism as will be later described. Hence, if the dust filter control circuit 121 is held by a holding member formed integral with the body unit 100, the flexes 157a and 157b are deformed and displaced as the hand-motion compensating mechanism operates. In this case, the flexes 157a and 157b effectively work because they are thin and flexible. In the present embodiment, the flexes 157a and 157b have a simple configuration, extending from two positions. They are best fit for use in cameras having a hand-motion compensating mechanism.

The dust removed from the surface of the dust filter 119 falls onto the bottom of the body unit 100, by virtue of the vibration inertia and the gravity. In this embodiment, a base 158 is arranged right below the dust filter 119, and a holding member 159 made of, for example, adhesive tape, is provided on the base 158. The holding member 159 reliably traps the dust fallen from the dust filter 119, preventing the dust from moving back to the surface of the dust filter 119. The vibration is produced in order to collect the dust right below the dust filter 119, and the holding member 159 is arranged immediately below the dust filter 119. The dust is therefore prevented from moving to the other mechanisms provided in the body unit 100, and will never impair the functions of the other mechanisms. This is an advantageous point.

The hand-motion compensating mechanism will be explained in brief. As shown in FIG. 1, the hand-motion compensating mechanism is composed of an X-axis gyro 160, a Y-axis gyro 161, a vibration control circuit 162, an X-axis actuator 163, a Y-axis actuator 164, an X-frame 165, a Y-frame 166 (holder 145), a frame 167, a position sensor 168, and an actuator drive circuit 169. The X-axis gyro 160 detects the angular velocity of the camera when the camera moves, rotating around the X axis. The Y-axis gyro 161 detects the angular velocity of the camera when the camera rotates around the Y axis. The vibration control circuit 162 calculates a value by which to compensate the hand motion, from the angular-velocity signals output from the X-axis gyro 160 and Y-axis gyro 161. In accordance with the hand-motion compensating value thus calculated, the actuator drive circuit 169 moves the CCD 117 in the X-axis direction and Y-axis direction, which are first and second directions orthogonal to each other in the XY plane that is perpendicular to the photographic optical axis, thereby to compensate the hand motion, if the photographic optical axis is taken as Z axis. More precisely, the X-axis actuator 163 drives the X-frame 165 in the X-axis direction upon receiving a drive signal from the actuator drive circuit 169, and the Y-axis actuator 164 drives the Y-frame 166 in the Y-axis direction upon receiving a drive signal from the actuator drive circuit 169. That is, the X-axis actuator 163 and the Y-axis actuator 164 are used as drive sources, the X-frame 165 and the Y-frame 166 (holder 145) which holds the CCD 117 of the image acquisition unit 116 are used as objects that are moved with respect to the frame 167. Note that the X-axis actuator 163 and the Y-axis actuator 164 are each composed of an electromagnetic motor, a feed screw mechanism, and the like. Alternatively, each actuator may be a linear motor using a voice coil motor, a linear piezoelectric motor or the like. The position sensor 168 detects the position of the X-frame 165 and the position of the Y-frame 166. On the basis of the positions the position sensor 168 have detected, the vibration control circuit 162 controls the actuator drive circuit 169, which drives the X-axis actuator 163 and the Y-axis actuator 164. The position of the CCD 117 is thereby controlled.

The dust removal mechanism of the first embodiment will be described in detail, with reference to FIGS. 3 to 6C. The dust filter 119 has at least one side symmetric with respect to a certain symmetry axis, and is a glass plate (optical element) of a polygonal plate as a whole (a square plate, in this embodiment). The dust filter 119 has a region flaring in the radial direction from the center. This region forms a transparent part. Alternatively, the dust filter 119 may be D-shaped, formed by cutting a part of a circular plate, thus defining one side. Still alternatively, it may formed by cutting a square plate, having two opposite sides accurately cut and having upper and lower sides. The above-mentioned fastening mechanism fastens the dust filter 119, with the transparent part opposed to the front of the LPF 118 and spaced from the LPF 118 by a predetermined distance. To one surface of the dust filter 119 (i.e., back of the filter 119, in this embodiment), the piezoelectric elements 120a and 120b, which are vibrating members, are secured at the upper and lower edges of the filter 119, by means of adhesion using adhesive. The piezoelectric elements 120a and 120b, which are arranged on the dust filter 119, constitute a vibrator 170. The vibrator 170 undergoes resonance when a voltage of a prescribed frequency is applied to the piezoelectric elements 120a and 120b, thereby achieving such bending vibration, as illustrated in FIGS. 4A to 4C.

As shown in FIG. 3, signal electrodes 171a and 172a are formed on the piezoelectric element 120a, and signal electrodes 171b and 172b are formed on the piezoelectric element 120b. Note that the hatched parts shown in FIG. 3 show the shapes of the signal electrodes clearly, not to illustrating the sections thereof. The signal electrodes 172a and 172b are provided on the back opposing the signal electrodes 171a and 171b, and are bent toward that surface of the piezoelectric element 120a, on which the signal electrodes 171a and 171b are provided. The flex 157a having the above-mentioned conductive pattern is electrically connected to the signal electrode 171a and signal electrode 172a. The flex 157b having the above-mentioned conductive pattern is electrically connected to the signal electrode 171b and signal electrode 172b. To the signal electrodes 171a, 171b, 172a and 172b, drive voltages that differ in phase are applied form the dust filter control circuit 121 through flexes 157a and 157b. The drive voltage, thus applied, can cause the dust filter 119 to undergo two standing-wave bending vibrations. The two standing-wave bending vibrations overlap each other, whereby the dust filter 119 accomplishes a two-dimensional travelling-wave vibration, as is shown in FIGS. 4A to 4C. The bending vibration shown in FIG. 4A is standing wave vibration. In FIG. 4A, the blacker the streaks, each indicating a node area 173 of vibration (i.e., area where the vibrational amplitude is small), the smaller the vibrational amplitude is. Note that the meshes shown in FIG. 4A are division meshes usually used in the final element method. In FIG. 4A, the dust filter 119 is hatched in different manners so that the convex area 174 which the neutral surface 173 is convex and the concave area 175 which the neutral surface 173 is concave may be easily be distinguished from each other. Note that the hatching does not represent sections.

As shown in FIG. 4A to 4C, those sides of the dust filter 119, which extend in the traveling direction (the Y-direction) of the wave, indicated by arrow 176, are shorter than the sides that extend orthogonal to the traveling direction of the wave. A vibrational amplitude larger than a prescribed value can therefore be provided in the focusing-beam passing area 149 to achieve high dust-removing efficiency though the wave is travel at shot distance. Although the vibrational amplitude is small near the vibration nodes 177, the wavelength λ' in the X-direction, i.e., $\lambda_x$, can be long. The region in which the vibrational amplitude is equal to or greater than the predetermined value can therefore be lengthened as is desired.

A method of producing a travelling wave will be explained in detail, with reference to FIG. 5. FIG. 5 shows a cross section identical to that shown in FIG. 4B. The vibrator 170 assumes the state of FIG. 5 at certain time $t_0$. Assume that a bending standing wave has been generated, as indicated by the solid lines and the broken lines. Then, the vibration z of a mass point $Y_1$ in the surface of the vibrator with respect to the Y-direction is of the same phase for each wavelength $\lambda_y$ of the bending vibration, if Y=0 is taken as the reference position with respect to the Y-direction. Thus, the at a given position y in the Y-direction, which takes a given position y in the Y-direction at given time t, the distance can be converted to a phase angle, if $Y=2\pi \cdot y/\lambda_y$. The vibration z can be expressed by Equation 1, as follows:

$$z = A \cdot \sin(Y) \cdot \cos(\omega t) \quad (1)$$

where ω is the angular velocity of vibration, and A is the maximum amplitude in the Z-direction.

A voltage of the frequency specified layer is applied, only to the piezoelectric element 120a arranged at position, y=0. Then, a standing wave of Equation 1 is produced. The solid lines indicate the state at time, t=0. (The broken lines indicate the state at time, t=π/ω.)

The piezoelectric elements 120a and 120b are arranged so that they may be polarized in the direction represented by arrow 178 in FIG. 5 and the distance H between the elements 120a and 120b (more precisely, between their midpoints with respect to the Y-direction) may be given by $H=k(\lambda_y/4)$, where k is an odd number. The voltage applied to the piezoelectric element 120b differs in phase by n/2 from the voltage applied to the piezoelectric element 120a. In this state, the vibration z at a given position y in the Y-direction has a value of the following Equation 2 that is similar to Equation 1:

$$z = A \cdot \sin(Y) \cdot \cos(\omega t) + A \cdot \sin\left(Y + \frac{\pi}{2}\right) \cdot \cos\left(\omega t + \frac{\pi}{2}\right) \quad (2)$$

The second term of Equation 2 represents the standing-wave vibration achieved when a voltage of the above-mentioned frequency is applied to the piezoelectric element 120a only. Equation 2 means that the standing-wave vibration of the piezoelectric element 120b and the standing-wave vibration of the piezoelectric element 120b are superimposed on each other.

Equation 2 can be transformed to the following:

$$z = A \cdot \sin(Y) \cdot \cos(\omega t) + A \cdot \sin\left(Y + \frac{\pi}{2}\right) \cdot \cos\left(\omega t + \frac{\pi}{2}\right)$$
$$= A \cdot \sin(Y) \cdot \cos(\omega t) - A \cdot \cos(Y) \cdot \sin(\omega t)$$
$$= A \cdot \sin(Y - \omega t)$$

Hence, the vibration z in this state can be expressed by Equation 3, as follows:

$$z = A \cdot \sin(Y - \omega t) \quad (3)$$

Equation 3 represents a travelling wave. Thus, a travelling wave can be produced if two vibrators, each capable of producing a standing wave, are arranged in the positional relation of $H=k(\lambda_y/4)$ and applied with voltages of a predetermined frequency, which have a phase difference of π/2.

The direction in which the travelling wave of Equation 3 propagates is the forward the Y-direction, i.e., the direction of arrow 176 shown in FIG. 5. In this case, the mass point $Y_1$ in the surface of the dust filter 119 moves in an elliptical orbit 179 as shown in FIG. 5. As seen from FIG. 5, the dust sticking to the dust filter 119 receives an inertial acting downwards. This force and the gravitational force combine together, removing the dust from the dust filter 119 more readily than otherwise.

Because of the travelling wave thus produced, an area 180 which has large vibrational amplitude and an area 180 which has almost no vibrational amplitude shown in FIGS. 4A to 4C, move upwards. Hence, the entire surface defines the large vibrational-amplitude area 180, except the vibration nodes 117Y (indicated by thick solid lines) at the sides parallel in the Y-direction and paced apart in the X-direction.

The vibration in the X-direction proves that a bending standing wave has been generated (see FIG. 4C). Namely, $\lambda_x/2 > E_x$, where $\lambda_x$ is the wavelength of the bending standing wave and $E_x$ is the X-direction size of the focusing-beam passing area 149. The focusing-beam passing area 149 is smaller than the area in which the vibrational amplitude is large by virtue of the propagation of the travelling wave. The focusing-beam passing area 149 therefore has sufficient vibrational amplitude and can reliably remove dust.

If the length $S_x$ that the piezoelectric elements 120a and 120b have in the X-direction is $\lambda_x/2$ or less as shown in FIG. 4C, the bending standing-wave vibrations in both areas will be of the same phase (not opposite in terms of phase). In this case, vibration can be generated at high efficiency. No problems will, of course, arise if the length Sx is greater than $\lambda_x/2$.

Even if a travelling wave is produced, the vibration nodes 177Y of vibration parallel to the Y-direction (indicated by thick broken lines in FIG. 6A) are nodes of the bending standing-wave vibration. This is why the dust filter 119 can be reliably supported without attenuating the vibration, if held by applying a force in the Z-direction to the parts corresponding to the nodes. The parts corresponding to the nodes 177Y vibrate only a little in the Z-direction, but may greatly vibrate in the X- and Y-directions. In such a case, the dust filter 119 may be pushed and supported by the support member 154 made of vibration-attenuating material such as rubber. This does not hinder the vibration of the dust filter 119. The dust filter 119 can therefore be efficiently supported. On the other hand, the seal 156 may be arranged, with its left and right sides aligned with the nodes 177Y. If the seal 156 is shaped like a lip, no large forces will act in the direction of bending vibrational amplitude, though the upper and lower sides of the seal 156 contact the travelling-wave generation unit. Therefore, the seal 156 attenuates the vibration, but a very little.

The prescribed frequency at which to vibrate the piezoelectric elements 120a and 120b is determined by the shape, dimensions, material and supported state of the dust filter 119, which is one component of the vibrator 170. In most cases, the temperature influences the elasticity coefficient of the vibrator 170 and is one of the factors that change the natural frequency of the vibrator 170. Therefore, it is desirable to measure the temperature of the vibrator 170 and to consider the change in the natural frequency of the vibrator 170, before the vibrator 170 is used. A temperature sensor (not shown) is therefore connected to a temperature measuring circuit (not shown), in the digital camera 10. The value by which to correct the vibrational frequency of the vibrator 170 in accordance with the temperature detected by the temperature sensor is stored in the nonvolatile memory 128. Then, the measured temperature and the correction value are read into the Bucom 101. The Bucom 101 calculates a drive frequency, which is used as drive frequency of the dust filter control circuit 121. Thus, vibration can be produced, which is efficient with respect to temperature changes, as well.

The dust filter control circuit 121 applies a voltage of the prescribed frequency to the piezoelectric elements 120a and 120b thus configured, in the direction of thickness of the piezoelectric elements 120a and 120b. As represented by Equation 2, the first frequency signal output from the dust filter control circuit 121 is supplied to the piezoelectric element 120a, and the second frequency signal, which has the same frequency as the first frequency signal but differs in phase by $\pi/2$ from the first frequency signal, is supplied to the piezoelectric element 120b.

When the frequency signals are so supplied to the piezoelectric elements 120a and 120b, the vibrator 170 produces a travelling wave that propagates upwards as indicated by arrow 176 in FIG. 6B as represented by Equation 3. As the travelling wave is produced, a point moves in the surface of the dust filter 119. This motion of the point represents a vibrational mode in which the vibration nodes 177Y define lines at both sides of the vibrator 170. In this embodiment, the dust filter 119 is pushed and supported at the nodes 177Y via the cushion members 152 and 153. The cushion members 152 and 153 are made of vibration-attenuating material such as rubber. Therefore, the dust filter 119 can vibrate in its planer direction, but not in the direction it is pushed. Hence, the cushion members 152 and 153 do not attenuate the vibration in the focusing-beam passing area 149 of the dust filter 119.

Figure 8:
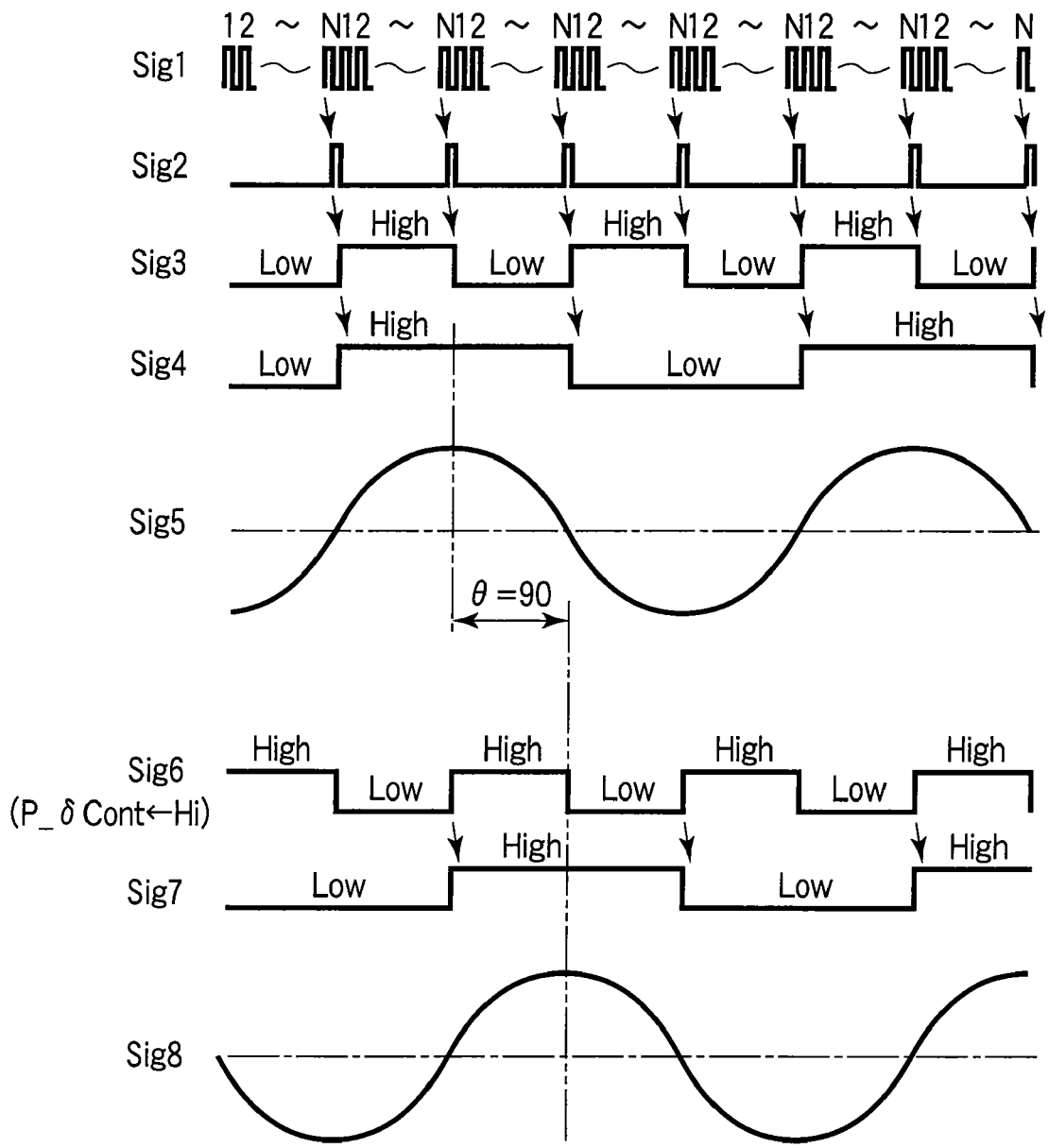
FIG. 8 is a timing chart showing the signals output from the components of the dust filter control circuit.

The dust filter control circuit 121 of the digital camera 10 according to this invention will be described below, with reference to FIGS. 7 and 8. The dust filter control circuit 121 has such a configuration as shown in FIG. 7. The components of the dust filter control circuit 121 produce signals (Sig1 to Sig8) of such waveforms as shown in the timing chart of FIG. 8. These signals will control the dust filter 119, as will be described below.

More specifically, as shown in FIG. 7, the dust filter control circuit 121 comprises a N-scale counter 1211, a first half-frequency dividing circuit 1212, a second half-frequency dividing circuit 1213, an exclusive-OR (ExOR) circuit 1214, a first inverter 1215, a transformer A 1216, a third half-frequency dividing circuit 1217, a second inverter 1218, a transformer B 1219, a plurality of MOS transistors $Q_{00}$, $Q_{01}$, $Q_{02}$, $Q_{10}$, $Q_{11}$ and $Q_{12}$, and a resistors $R_{00}$ and $R_{10}$.

The Bucom 101 has four output ports P_PwContA, P_PwContB, D_NCnt, and P_θCont, provided as control ports, and a clock generator 1011. The output ports P_PwContA, P_PwContB, D_NCnt, and P_θCont and the clock generator 1011 cooperate to control the dust filter control circuit 121 as follows. The clock generator 1011 outputs a pulse signal (basic clock signal) having a frequency much higher than the frequency of the signal that will be supplied to the piezoelectric elements 120a and 120b. This output signal is signal Sig1 that has the waveform shown in the timing chart of FIG. 8. The basic clock signal is input to the N-scale counter 1211.

The N-scale counter 1211 counts the pulses of the pulse signal. Every time the count reaches a prescribed value "N," the N-scale counter 181 produces a count-end pulse signal. Thus, the basic clock signal is frequency-divided by N. The signal the N-scale counter 1211 outputs is signal Sig2 that has the waveform shown in the timing chart of FIG. 8.

The pulse signal produced by means of frequency division does not have a duty ratio of 1:1. The pulse signal is supplied to the first half-frequency dividing circuit 1212. The first half-frequency dividing circuit 1212 changes the duty ratio of the pulse signal to 1:1. The frequency of the pulse signal is thereby halved. The pulse signal, thus changed in terms of duty ratio, corresponds to signal Sig3 that has the waveform shown in the timing chart of FIG. 8. The signal output to the first ½ frequency-dividing circuit 1212 is output to the second ½ frequency-dividing circuit 1213 and the ExOR circuit 1214. The ½ frequency-dividing circuit 1213 divides the frequency of the input pulse signal, outputting a pulse signal having half the input frequency. This pulse signal so converted in frequency corresponds to the signal Sig4 having the waveform shown in the timing chart of FIG. 8.

While the pulse signal, thus changed in duty ratio, is high, MOS transistor $Q_{01}$ to which this signal has been input is turned on. In the meantime, the pulse signal is supplied via the first inverter 1215 to MOS transistor $Q_{02}$. Therefore, while the pulse signal (signal Sig3) is low state, MOS transistor $Q_{02}$ to which this signal has been input is turned on. Thus, the transistors $Q_{01}$ and $Q_{02}$, both connected to the primary winding of the transformer A 1216, are alternately turned on. As a result, a signal Sig5 of such frequency as shown in FIG. 8 is produced in the secondary winding of the transformer A 1216.

The winding ratio of the transformer A 1216 is determined by the output voltage of the power-supply circuit 135 and the voltage needed to drive the one piezoelectric element 120a. Note that the resistor $R_{00}$ is provided to prevent an excessive current from flowing in the transformer A 1216.

In order to drive the piezoelectric element 120a, MOS transistor $Q_{00}$ must be on, and a voltage must be applied from the power-supply circuit 135 to the center tap of the transformer A 1216. In this case, MOS transistor $Q_{00}$ is turned on or off via the output port P_PwContA of the Bucom 101. Value "N" can be set to the N-scale counter 1211 from the output port D_NCnt of the Bucom 101. Thus, the Bucom 101 can change the drive frequency for the piezoelectric element 120a, by appropriately controlling value "N."

The frequency can be calculated by using Equation 4, as follows:

$$fdrv = \frac{fpls}{2N} \qquad (4)$$

where N is the value set to the N-scale counter 1211, fpls is the frequency of the pulse output from the clock generator 1011, and fdrv is the frequency of the signal supplied to the piezoelectric element 120a.

The calculation based on Equation 4 is performed by the CPU (control unit) of the Bucom 101.

On the other hand, the signal Sig3 output from the first ½ frequency-dividing circuit 1212 is supplied via the ExOR circuit 1214 to the third ½ frequency-dividing circuit 1217. In this case, the ExOR circuit 1214 inverts the pulse signal Sig3 if the output port P_θCont assumes High state. The pulse signal Sig3, thus inverted, is output to the third ½ frequency-dividing circuit 1217. If the output port P_θCont assumes Low state, the pulse signal Sig3 is not inverted and output to the third ½ frequency-dividing circuit 1217. The pulse signal output from the ExOR circuit 1214 corresponds to the signal Sig6 having the waveform show in the timing chart of FIG. 8. This pulse signal is frequency-divided by 2 in the third ½ frequency-dividing circuit 1217. The pulse signal, thus frequency-divided, corresponds to the signal Sig7 having the waveform shown in the timing chart of FIG. 8.

The second inverter 1218, MOS transistor $Q_{11}$, MOS transistor $Q_{12}$, and transformer B 1219 are thereby driven, generating a drive signal having a prescribed voltage. The drive signal corresponds to the signal sig8 having the waveform shown in the timing chart of FIG. 8.

Note that the second inverter 1218, MOS transistor $Q_{11}$, MOS transistor $Q_{12}$, transformer B 1219 and resistor $R_{10}$ perform functions that are almost identical to those of the first inverter 1215, MOS transistor $Q_{01}$, MOS transistor $Q_{02}$, transformer A 1216 and resistor $R_{00}$, respectively.

Each of the first to third frequency-dividing circuits 1212, 1213 and 1217 performs its function at the leading edge of the input signal. If the pulse signals input to them are inverted, the second and third frequency-dividing circuits 1213 and 1217 output pulse signals that differ in phase even if the pulse signals input to them have the same frequency. The phase difference is 90° (i.e., π/2) in this instance.

Hence, a phase difference of 90° (π/2) develops between the signal Sig5 supplied to the piezoelectric element 120a and the signal Sig8 supplied to the piezoelectric element 120b. This phase difference can be controlled by the output port P_θCont of the Bucom 101. If the output port P_θCont assumes, for example, High state, a phase difference of 90° (π/2) will develop. If the output port P_θCont assumes Low state, no phase difference will develop. That is, the dust filter 119 can be vibrated in different manners by controlling the output port P_θCont.

As described above, the dust filter 119 undergo two standing-wave bending vibrations as represented by Equation 2, if two signals having a phase difference of 90° (π/2) are supplied to the piezoelectric elements 120a and 120b. The two standing-wave bending vibrations are superimposed on each other, achieving bending travelling-wave vibration.

If the dust filter 119 is vibrated at a frequency in the ultrasonic region (i.e., 20 kHz or more), the operating state of the dust filter 119 cannot be aurally discriminated, because most people cannot hear sound falling outside the range of about 20 to 20,000 Hz. This is why the operation display LCD 129 or the operation display LED 130 has a display unit for showing how the dust filter 119 is operating, to the operator of the digital camera 10. More precisely, in the digital camera 10, the vibrating members (piezoelectric elements 120a and 120b) imparts vibration to the dust-screening member (dust filter 119) that is arranged in front of the CCD 117, can be vibrated and can transmit light. In the digital camera 10, the display unit is operated in interlock with the vibrating member drive circuit (i.e., dust filter control circuit 121), thus informing how the dust filter 119 is operating (later described in detail).

Figure 9A:
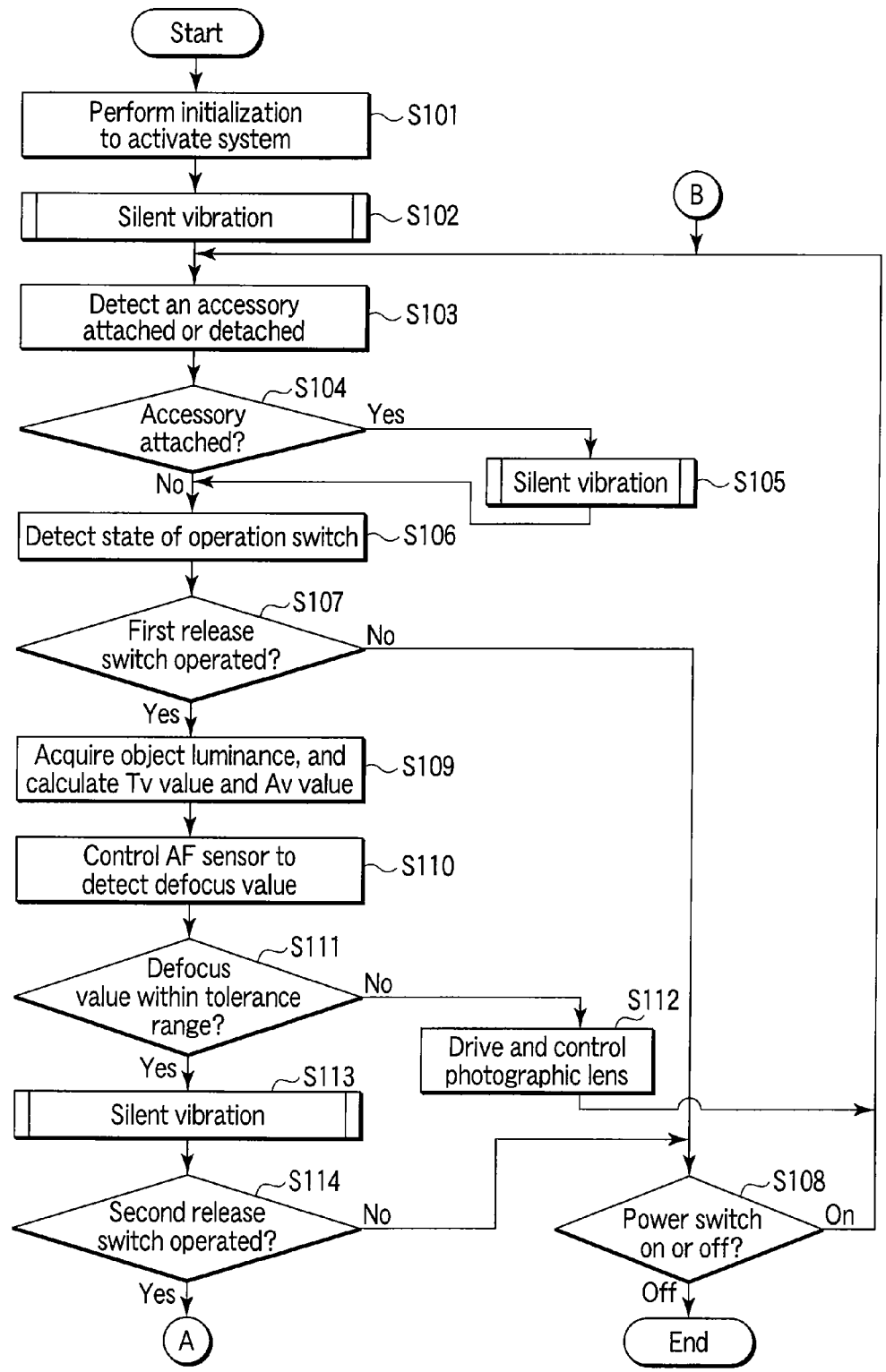
FIG. 9A is the first part of a flowchart showing an exemplary camera sequence (main routine) performed by the microcomputer for controlling the digital camera body according to the first embodiment.
Figure 9B:
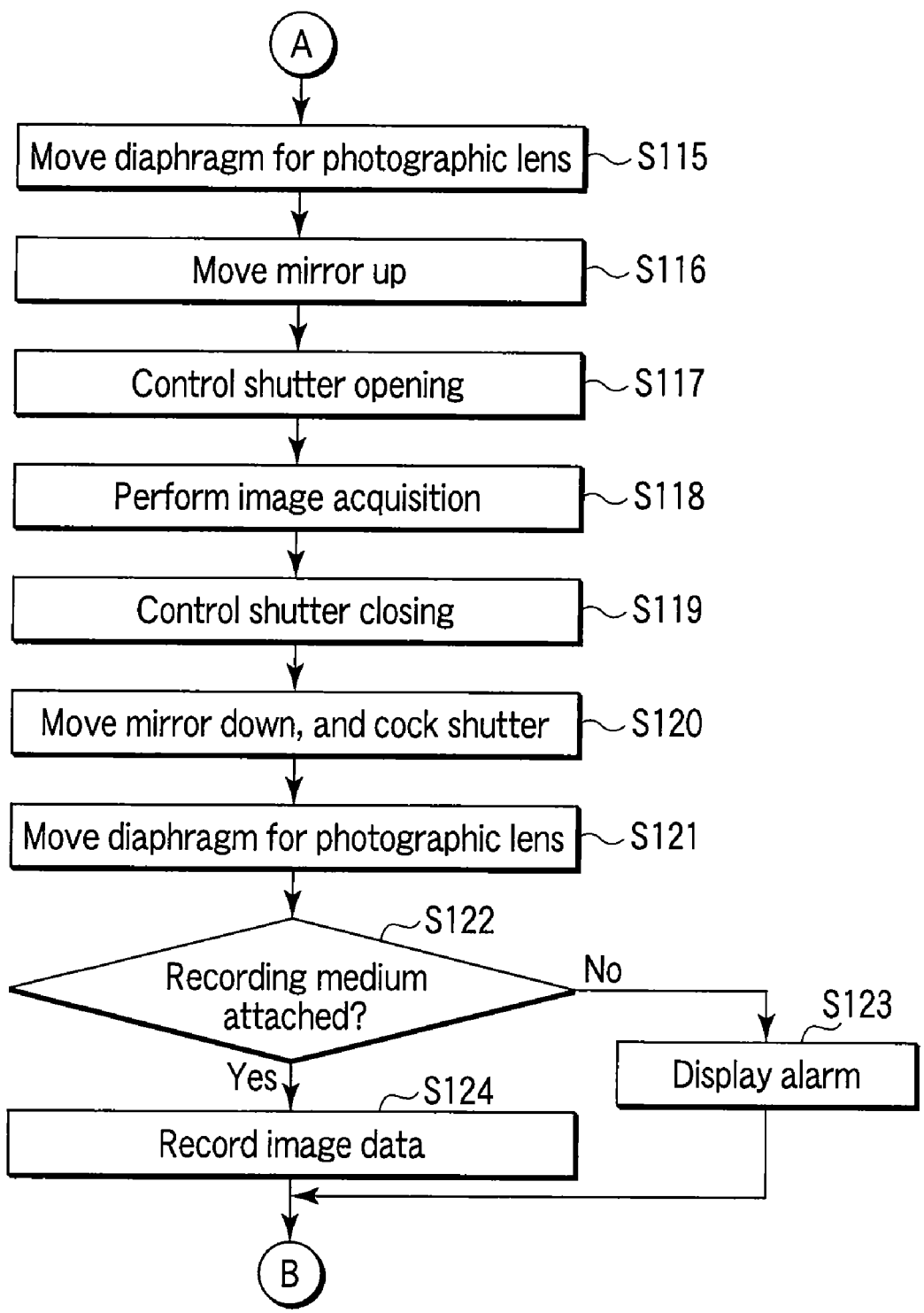
FIG. 9B is the second part of the flowchart showing the exemplary camera sequence (main routine)

To explain the above-described characteristics in detail, the control the Bucom 101 performs will be described with reference to FIGS. 9A to 13. FIGS. 9A and 9B show the flowchart that relates to the control program, which the Bucom 101 starts executing when the power switch (not shown) provided on the body unit 100 of the camera 10 is turned on.

First, a process is performed to activate the digital camera 10 (Step S101). That is, the Bucom 101 control the power-supply circuit 135. So controlled, the power-supply circuit 135 supplies power to the other circuit units of the digital camera 10. Further, the Bucom 101 initializes the circuit components.

Next, the Bucom 101 calls a sub-routine "silent vibration," vibrating the dust filter 119, making no sound (that is, at a frequency falling outside the audible range) (Step S102). The "audible range" ranges from about 200 to 20,000 Hz, because most people can hear sound falling within this range.

Steps S103 to S124, which follow, make a group of steps that is cyclically repeated. That is, the Bucom 101 first detects whether an accessory has been attached to, or detached from, the digital camera 10 (Step S103). Whether the lens unit 200 (i.e., one of accessories), for example, has been attached to the body unit 100 is detected. This detection, e.g., attaching or detaching of the lens unit 200, is performed as the Bucom 101 communicates with the Lucom 201.

If a specific accessory is detected to have been attached to the body unit 100 (YES in Step S104), the Bucom 101 calls a subroutine "silent vibration" and causes the dust filter 119 to vibrate silently (Step S105).

While an accessory, particularly the lens unit 200, remains not attached to the body unit 100 that is the camera body, dust is likely to adhere to each lens, the dust filter 119, and the like. It is therefore desirable to perform an operation of removing dust at the time when it is detected that the lens unit 200 is attached to the body unit 100. It is highly possible that dust adheres as the outer air circulates in the body unit 100 at the time a lens is exchanged with another. It is therefore advisable to remove dust when a lens is exchange with another. Then, it is determined that photography will be immediately performed, and the operation goes to Step S106.

If a specific accessory is not detected to have been attached to the body unit 100 (NO in Step S104), the Bucom 101 goes to the next step, i.e., Step S106.

In Step S106, the Bucom 101 detects the state of a specific operation switch that the digital camera 10 has.

That is, the Bucom 101 determines whether the first release switch (not shown), which is a release switch, has been operated from the on/off state of the switch (Step S107). The Bucom 101 reads the state. If the first release switch has not been turned on for a predetermined time, the Bucom 101 discriminates the state of the power switch (Step S108). If the power switch is on, the Bucom 101 returns to Step S103. If the power switch is off, the Bucom 101 performs an end-operation (e.g., sleep).

On the other hand, the first release switch may be found to have been turned on in Step S107. In this case, the Bucom 101 acquires the luminance data about the object, from the photometry circuit 115, and calculates from this data an exposure time (Tv value) and a diaphragm value (Av value) that are optimal for the image acquisition unit 116 and lens unit 200, respectively (Step S109).

Thereafter, the Bucom 101 acquires the detection data from the AF sensor unit 109 through the AF sensor drive circuit 110, and calculates a defocus value from the detection data (Step S110). The Bucom 101 then determines whether the defocus value, thus calculated, falls within a preset tolerance range (Step S111). If the defocus value does not fall within the tolerance range, the Bucom 101 drives the photographic lens 202 (Step S112) and returns to Step S103.

On the other hand, the defocus value may falls within the tolerance range. In this case, the Bucom 101 calls the subroutine "silent vibration" and causes the dust filter 119 to vibrate silently (Step S113).

Further, the Bucom 101 determines whether the second release switch (not shown), which is another release switch, has been operated (Step S114). If the second release switch is on, the Bucom 101 goes to Step S115 and starts the prescribed photographic operation (later described in detail). If the second release switch is off, the Bucom 101 returns to Step S108.

During the image acquisition operation, the electronic image acquisition is controlled for a time that corresponds to the preset time for exposure (i.e., exposure time), as in ordinary photography.

As the above-mentioned photographic operation, Steps S115 to S121 are performed in a prescribed order to photograph an object. First, the Bucom 101 transmits the Av value to the Lucom 201, instructing the Lucom 201 to drive the diaphragm 203 (Step S115). Thereafter, the Bucom 101 moves the quick return mirror 105 to the up position (Step S116). Then, the Bucom 101 causes the front curtain of the shutter 108 to start running, performing open control (Step S117). Further, the Bucom 101 makes the image process controller 126 perform "image acquisition operation" (Step S118). When the exposure to the CCD 117 (i.e., photography) for the time corresponding to the Tv value ends, the Bucom 101 causes the rear curtain of the shutter 108 to start running, achieving CLOSE control (Step S119). Then, the Bucom 101 drives the quick return mirror 105 to the down position and cocks the shutter 108 (Step S120).

Then, the Bucom 101 instructs the Lucom 210 to move the diaphragm 203 back to the open position (Step S121). Thus, a sequence of image acquisition steps is terminated.

Next, the Bucom 101 determines whether the recording medium 127 is attached to the body unit 100 (Step S122). If the recording medium 127 is not attached, the Bucom 101 displays an alarm (Step S123). The Bucom 101 then returns to Step S103 and repeats a similar sequence of steps.

If the recording medium 127 is attached, the Bucom 101 instructs the image process controller 126 to record the image data acquired by photography, in the recording medium 127 (Step S124). When the image data is completely recorded, the Bucom 101 returns to Step S103 again and repeats a similar sequence of steps.

In regard to the detailed relation between the vibration state and the displaying state will be explained in detail, the sequence of controlling the "silent vibration" subroutine will be explained with reference to FIGS. 10 to 13. The term "vibration state" means the state of the vibration induced by the piezoelectric elements 120a and 120b, i.e., vibrating members. FIG. 14 shows the form of a resonance-frequency wave that is continuously supplied to the vibrating members during silent vibration. The subroutine of FIG. 10, i.e., "silent vibration," and the subroutine of FIGS. 11 to 13, i.e., "display process" are routines for accomplishing vibration exclusively for removing dust from the dust filter 119. Vibrational frequency $f_0$ is set to a value close to the resonance frequency of the dust filter 119. In this case, for example, the vibrational frequency is 80 kHz, higher than at least 20 kHz, and produces sound not audible to the user.

As shown in FIG. 10, when the "silent vibration" is called, the Bucom 101 first reads the data representing the drive time (Toscf0) and drive frequency (resonance frequency: Noscf0) from the data stored in a specific area of the nonvolatile memory 128 (Step S201). At this timing, the Bucom 101 causes the display unit provided in the operation display LCD 129 or operation display LED 130 to turn on the vibrational mode display, as shown in FIG. 11 (Step S301). The Bucom 101 then determines whether a predetermined time has passed (Step S302). If the predetermined time has not passed, the Bucom 101 makes the display unit keep turning on the vibrational mode display. Upon lapse of the predetermined time, the Bucom 101 turns off the displaying of the vibrational mode display (Step S303).

Next, the Bucom 101 outputs the drive frequency Noscf0 from the output port D_NCnt to the N-scale counter 181 of the dust filter control circuit 121 (Step S202).

In the following steps S203 to S205, the dust is removed as will be described below. First, the Bucom 101 sets the output ports P_PwContA and P_PwContB to High, thereby starting the dust removal (Step S203). At this timing, the Bucom 101 starts displaying the vibrating operation as shown in FIG. 12 (Step S311). The Bucom 101 then determines whether or not the predetermined time has passed (Step S312). If the predetermined time has not passed, the Bucom 101 keeps displaying the vibrating operation. Upon lapse of the predetermined time, the Bucom 101 stops displaying of the vibrating operation (Step S313). The display of the vibrating operation, at this time, changes as the time passes or as the dust is removed (how it changes is not shown, though). The predetermined time is almost equal to Toscf0, i.e., the time for which the vibration (later described) continues.

If the output ports P_PwContA and P_PwContB is set to High in Step S203, the piezoelectric elements 120a and 120b vibrate the dust filter 119 at the prescribed vibrational frequency (Noscf0), removing the dust 178 from the surface of the dust filter 119. At the same time the dust is removed from the surface of the dust filter 119, air is vibrated, producing an ultrasonic wave. The vibration at the drive frequency Noscf0, however, does not make sound audible to most people. Hence, the user hears nothing. The Bucom 101 waits for the predetermined time Toscf0, while the dust filter 119 remains vibrated (Step S204). Upon lapse of the predetermined time Toscf0, the Bucom 101 sets the output ports P_PwContA and P_PwContB to Low, stopping the dust removal operation (Step S205). At this timing, the Bucom 101 turns on the display unit, whereby the displaying of the vibration-end display is turned on (Step S321). When the Bucom 101 determines (in Step S322) that the predetermined time has passed, the displaying of the vibration-end display is turned off (Step S323). The Bucom 101 then returns to the step next to the step in which the "silent vibration" is called.

The vibrational frequency $f_0$ (i.e., resonance frequency Noscf0) and the drive time (Toscf0) used in this subroutine define such a waveform as shown in the graph of FIG. 14. As can be seen from this waveform, constant vibration ($f_0$=80 kHz) continues for a time (i.e., Toscf0) that is long enough to accomplish the dust removal.

That is, the vibrational mode adjusts the resonance frequency applied to the vibrating member, controlling the dust removal.

Second Embodiment

A dust filter used in a digital camera that is a second embodiment of the image equipment according to this invention will be described with reference to FIG. 15A to 15C. Only the points that distinguish this embodiment from the first embodiment (FIG. 4A to 4C) will be explained below.

This embodiment differs from the first embodiment in two respects. First, it differs in the position of the piezoelectric element 120a that is used as a first vibrating member. The piezoelectric element 120a is arranged on the front surface (first surface) of the dust filter 119, which face away from the back surface (second surface) of the dust filter 119 on which the piezoelectric element 120b is arranged. Further, position of the piezoelectric element 120a is position at the lower side of the dust filter 119 and near the piezoelectric element 120b. However, the distance H between the centers of the piezoelectric elements 120a and 120b is given as H=k (π/4), where k is an odd number. FIG. 15A to 15C illustrate the case where k=1, and the piezoelectric element 120a is provided such that it is opposed to the piezoelectric element 120b.

Second, this embodiment differs in the shape of the piezoelectric elements 120a and 120b. The piezoelectric elements 120a and 120b are shorter in the X-direction and longer in the Y-direction, than in the first embodiment. This is because the piezoelectric elements 120a and 120b are arranged overlapping each other in the Y-direction. The piezoelectric elements 120a and 120b are as long in the Y-direction as they are short in the X-direction. Hence, they can produce vibration energy as large as in the first embodiment. Since the focusing-beam passing area 149 is shifted in the Y-direction, the dust filter 119 can be shorter in the Y-direction than otherwise. Further, the pushing member directly push the dust filter 119. It can be identical to the push member used in the first embodiment. In the size of Z-direction, the part of the dust filter 119, at which the piezoelectric element 120a is arranged, is identical to the first embodiment, but that part not arranged the piezoelectric element 120a can be smaller than in the first embodiment. Moreover, the piezoelectric elements 120a and 120b have a length of $\lambda_x/2$ or less, where $\lambda_x$ is the length of the bending standing wave. Therefore, both piezoelectric elements 120a and 120b lie in an area where they achieve bending standing-wave vibrations in the same phase (not in opposite phases). They can therefore generate vibration at high efficiency.

Of course, nodes 177 having almost no vibrational amplitude are formed as in the first embodiment.

Third Embodiment

The subroutine "silent vibration" called in the camera sequence (main routine) that the Bucom performs in a digital camera that is a third embodiment of the image equipment according to this invention will be described with reference to FIG. 16. FIG. 16 illustrates a modification of the subroutine "silent vibration" shown in FIG. 15. The third embodiment differs from the first embodiment in the operating mode of the dust filter 119. In the first embodiment, the dust filter 119 is driven at a fixed frequency, i.e., frequency $f_0$, producing a travelling wave. By contrast, in the third embodiment, the dust filter 119 undergoes vibration that is a combination of standing-wave vibration and travelling-wave vibration.

In the subroutine "silent vibration" of FIG. 16, the vibrational frequency $f_0$ is set to a value close to the resonance frequency of the dust filter 119. In the embodiment, for example, the vibrational frequency $f_0$ is 80 kHz. That is, the vibrational frequency exceeds at least 20 kHz, and makes sound not audible to the user.

First, the Bucom 101 reads the data representing the drive time (Toscf0), drive-start frequency (Noscfs), frequency change value ($\Delta f$) and drive-end frequency (Noscft), from the data stored in a specific area of the nonvolatile memory 128 (Step S211). At this timing, the Bucom 101 causes the display unit to display the vibrational mode as shown in FIG. 11, in the same way as in the first embodiment.

Next, the Bucom 101 sets the drive-start frequency (Noscfs) as drive frequency (Noscf) (Step S212). The Bucom 101 then outputs the drive frequency (Noscf) from the output port D_NCnt to the N-scale counter 181 of the dust filter control circuit 121 (Step S213).

In the following steps S203 et seq., the dust is removed as will be described below. First, the dust removal is started. At this time, the display of the vibrating operation is performed as shown in FIG. 12, as in the first embodiment.

First, the Bucom 101 sets the output ports P_PwContA and P_PwContB to High, to achieve dust removal (Step S203). The piezoelectric elements 120a and 120b vibrate the dust filter 119 at the prescribed vibrational frequency (Noscf). At this point, the vibration generated from the frequency signal applied deviates in terms of phase because the vibration is not at the resonance frequency. Consequently, the dust filter 119 undergoes travelling-wave vibration containing a standing-wave vibration component. Thus, the dust is removed from the surface of the dust filter 119, but not from those parts of the surface, which are close to the nodes of the standing wave. This is because the vibrational amplitude is small at the nodes. This vibration continues for the drive time (Toscf0) (Step S204). Upon lapse of this drive time (Toscf0), the Bucom 101 determines whether the drive frequency (Noscf) is equal to the drive-end frequency (Noscft) (Step S214). If the drive frequency is not equal to the drive-end frequency (NO in Step S214), the Bucom 101 adds the frequency change value ($\Delta f$) to the drive frequency (Noscf), and sets the sum to the drive frequency (Noscf) (Step S215). Then, the Bucom 101 repeats the sequence of Steps S212 to S214.

If the drive frequency (Noscf) is equal to the drive-end frequency (Noscft) (YES in Step S214), the Bucom 101 sets the output ports P_PwContA and P_PwContB to Low, stopping the vibration of the piezoelectric elements 120a and 120b (Step S205), thereby terminating the "silent vibration." At this point, the display of vibration-end is performed as shown in FIG. 13, as in the first embodiment.

If the frequency is so changed, the vibrations achieved by the piezoelectric elements 120b and 120b will change not only in phase, but also in amplitude, as described above. In view of this, the drive-start frequency (Ncoscfs), the frequency change value ($\Delta f$) and the drive-end frequency (Noscft) are set so that the frequency may surpass a value that causes the dust filter 119 to undergo travelling-wave vibration. As a result, the dust filter 119 undergoes vibration that changes in the following manner. First, the standing-wave vibration and travelling-wave vibration mix together. Then, the standing-wave vibration component gradually decreases, while the travelling-wave vibration component gradually increases. When the vibration becomes almost travelling-wave vibration, the travelling-wave vibration component starts decreasing, and the standing-wave vibration component starts increasing again. Thereby, the dust remaining on the surface of the dust filter 119 by the standing-wave vibration and the dust not removed by small-amplitude vibration, at a frequency other than the resonance frequency, can be removed from the dust filter 119.

If the difference between the drive-start frequency (Noscfs) and the drive-end frequency (Noscft) is large, the fluctuation of the resonance frequency, due to the temperature of the vibrator 170 or to the deviation in characteristic change of the vibrator 170, during the manufacture, can be absorbed. Hence, the dust 178 can be reliably removed from the dust filter 119, by using an extremely simple circuit configuration.

The phase difference between the voltages applied to the piezoelectric elements 120a and 120b is $\pi/2$ in the embodiments described above. Nonetheless, the phase difference may be of any other value, because a travelling-wave vibration component is produced unless the voltages have the same phase.

The present invention has been explained, describing some embodiments. Nonetheless, this invention is not limited to the embodiments described above. Various changes and modifications can, of course, be made within the scope and spirit of the invention.

For example, a mechanism that applies an air flow or a mechanism that has a wipe may be used in combination with the dust removal mechanism having the vibrating member, in order to remove the dust 178 from the dust filter 119.

In the embodiments described above, the vibrating members are piezoelectric elements. The piezoelectric elements may be replaced by electrostrictive members or super nagnetostrictive elements.

In order to remove dust more efficiently from the member vibrated, the member may be coated with an indium-tin oxide (ITO) film, which is a transparent conductive film, indium-zinc film, poly 3,4-ethylenedioxy thiophene film, surfactant agent film that is a hygroscopic anti-electrostatic film, siloxane-based film, or the like. In this case, the frequency, the drive time, etc., all related to the vibration, are set to values that accord with the material of the film.

Moreover, the optical LPF 118, described as one embodiment of the invention, may be replaced by a plurality of optical LPFs that exhibit birefringence. Of these optical LPFs, the optical LPF located closest to the object of photography may be used as a dust-screening member (i.e., a subject to be vibrated), in place of the dust filter 119 shown in FIG. 2A.

Further, a camera may does not have the optical LPF 118 of FIG. 2A described as one embodiment of the invention, and the dust filter 119 may be used as an optical element such as an optical LPF, an infrared-beam filter, a deflection filter, or a half mirror.

Furthermore, the camera may not have the optical LPF 118, and the dust filter 119 may be replaced by the protection glass plate 142 shown in FIG. 2A. In this case, the protection glass plate 142 and the CCD chip 136 remain free of dust and moisture, and the structure of FIG. 2A that supports and yet vibrates the dust filter 119 may be used to support and vibrate the protection glass plate 142. Needless to say, the protection glass plate 142 may be used as an optical element such as an optical LPF, an infrared-beam filter, a deflection filter, or a half mirror.

The image equipment according to this invention is not limited to the image acquisition apparatus (digital camera) exemplified above. This invention can be applied to any other apparatus that needs a dust removal function. The invention can be practiced in the form of various modifications, if necessary. More specifically, a dust moving mechanism according to this invention may be arranged between the display element and the light source or image projecting lens in an image projector.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A vibrating device comprising:
   a dust-screening member shaped like a plate as a whole;
   a first vibrating member secured to the dust-screening member and configured to cause, when driven alone, the dust-screening member to undergo first standing-wave vibration; and
   a second vibrating member secured to the dust-screening member and configured to cause, when driven alone, the dust-screening member to undergo second standing-wave vibration, wherein
   the first vibrating member and the second vibrating member are so positioned that the first standing-wave vibration and second standing-wave vibration produced by the first and second vibrating members, respectively, overlap each other, thus producing a travelling wave propagating in one direction and having node regions at an outer circumferential edge of the dust-screening member, the node regions having virtually no vibrational amplitude.

2. The device according to claim 1, further comprising a support member configured to support the dust-screening member at a given position, wherein
   the support member is arranged in the node regions located at the outer circumferential edge of the dust-screening member and having virtually no vibrational amplitude.

3. The device according to claim 1, wherein the first and second vibrating members are shaped like a rectangle having long sides extending in a direction orthogonal to a direction in which the travelling wave propagates.

4. The device according to claim 3, wherein
   the first vibrating member is constituted by a first piezoelectric element,
   the second vibrating member is constituted by a second piezoelectric element, and
   the first piezoelectric element and the second piezoelectric element are spaced apart by distance of $k \cdot (\lambda/4)$, where $\lambda$ is wavelength of the traveling wave, as measured in the direction in which the travelling wave propagates, and k is an odd number.

5. The device according to claim 4, further comprising a drive unit configured to supply two frequency signals to the first piezoelectric element and the second piezoelectric element, respectively, the frequency signal being different in phase by $\pi/2$.

6. The device according to claim 4, wherein
   the dust-screening member is substantially rectangular,
   at least a standing wave having a wavelength $\lambda'$ extending in a direction orthogonal to the direction in which the travelling wave propagates is produced, and
   the first piezoelectric element and the second piezoelectric element are substantially rectangular, each having long sides which have a length of at most half (½) the wavelength $\lambda'$ of the standing wave.

7. The device according to claim 4, wherein the first piezoelectric element and the second piezoelectric element are provided on the same surface of the dust-screening member.

8. The device according to claim 4, wherein
   the first piezoelectric element is provided on a first surface of the dust-screening member, and
   the second piezoelectric element is provided on a second surface of the dust-screening member, which faces away from the first surface of the dust-screening member, and is opposed to first piezoelectric element.

9. An image equipment comprising:
   an image forming element having an image surface on which an optical image is formed;
   a dust-screening member which is shaped like a plate as a whole and has a light-transmitting region flaring in a radial direction from the center, facing the image surface and spaced therefrom by a predetermined distance;
   a sealing structure configured to surround the image forming element and the dust-screening member, thereby providing a closed space in which the image forming element and the dust-screening member that face each other;
   a first vibrating member arranged on the dust-screening member and outside the light-transmitting region through which a light beam for forming an optical image on the image surface passes, and configured to cause, when driven alone, the dust-screening member to undergo first standing-wave vibration; and
   a second vibrating member arranged on the dust-screening member and outside the light-transmitting region, not overlapping the first vibrating member, and configured to cause, when driven alone, the dust-screening member to undergo second standing-wave vibration, wherein
   the first vibrating member and the second vibrating member are so positioned that the first standing-wave vibration and second standing-wave vibration produced by the first and second vibrating members, respectively, overlap each other, thus producing a travelling wave propagating in one direction and having node regions at an outer circumferential edge of the dust-screening member, the node regions having virtually no vibrational amplitude.

10. The equipment according to claim 9, further comprising a support member configured to support the dust-screening member, holding the dust-screening member spaced by the prescribed distance and opposed to the image surface of the image forming element, wherein
the support member is arranged in the node regions located at the outer circumferential edge of the dust-screening member and having virtually no vibrational amplitude.

11. The equipment according to claim 10, wherein the first and second vibrating members are shaped like a rectangle having long sides extending in a direction orthogonal to a direction in which the travelling wave propagates.

12. The equipment according to claim 11, wherein
the first vibrating member is constituted by a first piezoelectric element,
the second vibrating member is constituted by a second piezoelectric element, and
the first piezoelectric element and the second piezoelectric element are spaced apart by distance of $k \cdot (\lambda/4)$, where $\lambda$ is wavelength of the traveling wave, as measured in the direction in which the travelling wave propagates, and k is an odd number.

13. The equipment according to claim 12, wherein
at least a standing wave having a wavelength $\lambda'$ extending in a direction orthogonal to the direction in which the travelling wave propagates is produced, and
the light-transmitting region has a width of at most $\lambda'/2$, as measured in a direction orthogonal to the direction in which the travelling wave propagates.

14. The equipment according to claim 12, further comprising a drive unit configured to supply two frequency signals to the first piezoelectric element and the second piezoelectric element, respectively, the frequency signal being different in phase by $\pi/2$.

15. The equipment according to claim 12, wherein
the dust-screening member is substantially rectangular,
at least a standing wave having a wavelength $\lambda'$ extending in a direction orthogonal to the direction in which the travelling wave propagates is produced, and
the first piezoelectric element and the second piezoelectric element are substantially rectangular, each having long sides which have a length of at most half (½) the wavelength $\lambda'$ of the standing wave.

16. The equipment according to claim 12, wherein the first piezoelectric element and the second piezoelectric element are provided on the same surface of the dust-screening member.

17. The equipment according to claim 16, wherein the first piezoelectric element and the second piezoelectric element are arranged, facing each other across the light-transmitting region of the dust-screening member.

18. The equipment according to claim 12, wherein
the first piezoelectric element is provided on a first surface of the dust-screening member, and
the second piezoelectric element is provided on a second surface of the dust-screening member, which faces away from the first surface of the dust-screening member, and is opposed to first piezoelectric element.

19. The equipment according to claim 18, wherein the first piezoelectric element and the second piezoelectric element are arranged on one side of the light-transmitting region of the dust-screening member.

* * * * *